(12) United States Patent
Shinozaki

(10) Patent No.: US 7,676,227 B2
(45) Date of Patent: Mar. 9, 2010

(54) COMMUNICATION SYSTEM AND HANDOVER COMMUNICATION METHOD

(75) Inventor: Atsushi Shinozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 896 days.

(21) Appl. No.: 10/568,164

(22) PCT Filed: Sep. 4, 2003

(86) PCT No.: PCT/JP03/11270

§ 371 (c)(1),
(2), (4) Date: Feb. 9, 2006

(87) PCT Pub. No.: WO2005/025262

PCT Pub. Date: Mar. 17, 2005

(65) Prior Publication Data

US 2006/0240826 A1    Oct. 26, 2006

(51) Int. Cl.
*H04W 4/00* (2009.01)
*H04W 36/00* (2009.01)

(52) U.S. Cl. ............... 455/437; 455/434; 455/436; 455/442; 370/331

(58) Field of Classification Search ............ 455/41.2, 455/59, 61–62, 63.1, 67.11, 67.13, 69–70, 455/72, 101–102, 436–451, 509, 517, 522, 455/524–525, 550.1, 556.2, 560–561; 714/6, 714/48–49, 52–57, 701, 703–705, 746–747, 714/751–755, 757–762, 786–789, 798–803, 714/774; 375/240.26, 240.27, 243, 267, 375/299, 347; 370/328–329, 331, 338, 341; 445/422.1, 434, 436–442, 450, 509, 550.1, 445/561

See application file for complete search history.

(56) References Cited

U.S. PATENT DOCUMENTS 6,728,296 B1 * 4/2004 Yung ............................ 375/141
6,868,520 B1 * 3/2005 Fauconnier .................. 714/790

FOREIGN PATENT DOCUMENTS

| JP | 2000-197095 | 7/2000 |
| JP | 2001-45539  | 2/2001 |
| JP | 2001-54153  | 2/2001 |

OTHER PUBLICATIONS

International Search Report dated Dec. 9, 2003.

* cited by examiner

*Primary Examiner*—Meless N Zewdu
(74) *Attorney, Agent, or Firm*—Katten Muchin Rosenman LLP

(57) ABSTRACT

When a downlink transmission is performed in the handover state in a mobile communication system having a mobile station, base stations and a base station controller, user data from the base station controller is transmitted from a first base station to the mobile station and error correction code for the user data from the base station controller is transmitted from a second base station to the mobile station. The mobile station subjects the received user data to error correction processing using the received error correction code and decodes the user data. Also, at the time of an uplink transmission in the handover state, user data and error correction code are transmitted from the mobile station to the base station controller via separate transmission paths.

3 Claims, 32 Drawing Sheets

COMMUNICATION SYSTEM AND HANDOVER COMMUNICATION METHOD

CROSS-REFERENCE TO RELATED APPLICATIONS

This application is the National Stage of International Application No. PCT/JP2003/11270, filed Sep. 4, 2003, the content of which is herein incorporated by reference.

BACKGROUND OF THE INVENTION

This invention relates to a communication system and to a handover communication method thereof. More particularly, the invention relates to a communication system, which is equipped with a mobile station, base station and base station controller, for sending and receiving user data via two or more transmission paths between the base station controller and mobile station at the time of handover, and to a handover communication method.

A wireless communication system that employs the W-CDMA scheme has been standardized by the 3GPP ($3^{rd}$ Generation Partnership Project), and actual service has begun in Japan as well. FIG. 34 is a schematic view of the configuration of a wireless communication system. A radio access system (RAN: Radio Access Network) in 3GPP comprises an RNC (Radio Network Controller) 1, base stations (Node B's) 3a, 3b, ... and UE's (User Equipment: mobile stations) 5, 6, .... A base station controller 1 is connected to a CN (Core Network) 7 by a Iu interface, and the base stations 3a, 3b are connected to the base station controller 1 by Iub interfaces.

In such a mobile communication system compliant with 3GPP specifications, transmission power control is carried out in such a manner that a prescribed error rate is obtained at the base stations 3a, 3b and mobile stations 5, 6 and in such a manner that transmission power will not become excessive. FIG. 35 is a diagram for describing such transmission power control (inner-loop control) and illustrates a case where the transmission power of a base station is controlled.

A spread-spectrum modulator $3a_1$ of the base station 3a spread-spectrum modulates transmit data using a spreading code conforming to a specified channel. The spread-spectrum modulated signal is subjected to processing such as orthogonal modulation and frequency conversion and the resultant signal is input to a power amplifier $3a_2$, which amplifies this signal and transmits the amplified signal toward the mobile station 5 from an antenna. A despreading unit 5a in the receiver of the mobile station applies despread processing to the receive signal and a demodulator 5b demodulates the receive data. A SIR measurement unit 5c measures the power ratio between the receive signal and an interference signal and a comparator 5d compares target SIR and measured SIR. If the measured SIR is greater than the target SIR, the comparator 5d creates a command (a down command) that lowers the transmission power by TPC (Transmission Power Control) bits. If the measured SIR is less than the target SIR, the comparator 5d creates a command (an up command) that raises the transmission power by the TPC bits. The target SIR is a SIR value necessary to obtain, e.g., $10^{-3}$ (error occurrence at a rate of once every 1000 times). This value is input to the comparator 5d from a target-SIR setting unit 5e. A spread-spectrum modulator 5f spread-spectrum modulates the transmit data and TPC bits. After spread-spectrum modulation, the mobile station 5 subjects the signal to processing such as a DA conversion, orthogonal modulation, frequency conversion and power amplification and transmits the resultant signal toward the base station 3a from an antenna. A despreading unit $3a_3$ on the side of the base station applies despread processing to the signal received from the mobile station 5, and a demodulator $3a_4$ demodulates the receive data and TPC bits and controls the transmission power of the power amplifier $3a_2$ in accordance with a command specified by the TPC bits.

FIGS. 36 and 37 are uplink and downlink frame structures, respectively, standardized by 3GPP. "Down" indicates the direction in which a base station transmits data to a mobile station. Conversely, "up" indicates the direction in which a mobile station transmits data to a base station.

As illustrated in FIG. 36, the uplink frame has a dedicated data channel (Dedicated Physical Data Channel: DPDCH) on which only transmit data is transmitted, and a dedicated control channel (Dedicated Physical Control Channel: DPCCH) on which a pilot and control data such as TPC bit information are multiplexed and transmitted. After each of these is spread by an orthogonal code, they are mapped onto real and imaginary axes and multiplexed. One frame on the uplink has a duration of 10 msec and is composed of 15 slots (slot #0 to slot #14). Each slot of the dedicated control channel DPCCH consists of ten bits, the symbol rate is 15 ksps, and the slot transmits a pilot PILOT, transmission power control data TPC, a transport format combination indicator TFCI and feedback information FBI. It should be noted that DPCCH and DPDCH are both referred to as a DPCH (Dedicated Physical Channel).

As illustrated in FIG. 37, the downlink frame is such that one frame is equal to 10 msec and is composed of 15 slots #0 to slot #14. A dedicated physical data channel DPDCH that transmits a first data portion Data1 and a second data portion Data2 and a dedicated physical control channel DPCCH that transmits PILOT, TPC and TFCI are time-division multiplexed slot by slot. The dedicated physical data channel DPDCH has ① a dedicated traffic channel DTCH and ② a dedicated control channel DCCH. The dedicated traffic channel DTCH is a channel that transmits dedicated traffic information between the mobile station and network, and the dedicated control channel DCCH is a channel used in the transmission of dedicated control information between the mobile station and network.

The foregoing relates to a case where one mobile station is communicating with one base station. At the time of handover due to travel, however, the mobile station 5 communicates with two or more base stations 3a, 3b simultaneously, as illustrated in FIG. 38. At the time of such handover, the base station controller 1 selects the uplink data of the best quality from the uplink data received from the plurality of base stations 3a, 3b. Selecting the data having the best quality is referred to as "selective combining", and such control at the time of handover is referred to as "diversity handover (DHO)".

DHO is not limited to the uplink and is performed similarly also on the downlink. As shown in FIG. 39, the mobile station 5 selects the downlink data of the best quality from among a plurality of items of downlink data received from the base station controller 1 via the plurality of base stations 3a, 3b. That is, when the DHO state is in effect, the base station controller 1 duplicates data that has entered from a core network, which is the host network, and allocates the data to the base stations 3a, 3b. The data allocated is subjected to error correction encoding processing such as convolutional encoding, after which it is transmitted from each of the base stations 3a, 3b to the mobile station 5 utilizing a wireless section. The routes connecting the base station controller 1 to the mobile station 5 via the base stations 3a, 3b are expressed by transmission paths, and the system has two transmission paths in the illustration. Since error readily occurs in a wireless section, the mobile station 5 selects whichever of the data received from the base stations 3a, 3b has the better quality.

More specifically, as illustrated in FIG. 40, the mobile station 5 receives data from the base stations 3a, 3b via multipaths $6a_1$, $6a_2$, . . . ; $6b_1$, $6b_2$, . . . , maximum-ratio combines the data received via the multipaths on a per-base-station basis, applies error correction processing to the respective items of data that are the result of maximum ratio combining, compares the qualities with one another and selects the data having the best quality.

The foregoing relates to the case of DHO, in which the same data is transmitted from separate base stations 3a, 3b. However, handover control (sector handover: SHO) similar to DHO is carried out also in a second scheme in which, as shown in FIG. 41, the area surrounding one base station 3 is divided into sectors and directional beams are emitted from antennas AT1 to AT3 in sectors SC1 to SC3. That is, if mobile station 5 is present in sector SC1, data is transmitted only from antenna AT1. However, if the mobile station 5 moves and reaches the area at the boundary of the neighboring sector SC2, then the base station 3 transmits identical data from both antennas AT1 and AT2. In a manner similar to that of DHO, the mobile station 5 maximum-ratio combines data received via multipaths on a per-sector-antenna basis, applies error correction processing to the respective items of data that are the result of maximum ratio combining, compares the qualities with one another and selects the data having the best quality.

Such DHO and SHO control is advantageous in that reception quality can be improved. However, the following problems arise:

The first problem is that the amount of data involved in DHO increases and so does the frequency band. The fact that the same data is transmitted from the mobile station 5 to the base stations 3a and 3b or the fact that the same data is transmitted from the base stations 3a and 3b to the mobile station 5 means that the band required for transmission needs to be doubled. The principle of DHO allows a plurality of different base stations to serve as relay nodes for transmitting data. Consequently, there are cases where three or more base stations are adopted as relay nodes. The band required for transmission in such case increases by a factor of three or four, etc., namely by the number of relay nodes.

The second problem is that the amount of data involved in SHO increases and so does the frequency band. In the case of SHO, the band required for transmission needs to be doubled because the base station 3 transmits the same data to a plurality of sectors. The principle of SHO allows a plurality of different sectors to serve as transmission paths for data transmission. Consequently, there are cases where three or more sectors are adopted as transmission paths. The band required for transmission in such case increases by a factor of three or four, etc., namely by the number of transmission paths.

The third problem is an increase in transmission power, and this causes noise in other mobile stations. If the band of the data to be transmitted is large, transmission power in the wireless section is raised in a CDMA scheme in order to maintain quality. If communication is being performed via a plurality of transmission paths at the time of handover, the same band is necessary on all transmission paths. As a result, the power value used by a single mobile station rises and this causes noise in other mobile stations.

A fourth problem is excessive quality owing to superfluous power. If the quality of data from only one of the base stations 3a, 3b in the DHO state is good (i.e., if the error in the wireless section can be corrected) at the mobile station 5, then the transmission power value in the wireless section can be made the minimum necessary value. In actuality, however, it is difficult to exercise control so as to assure the quality of only one of these items data by power control. With transmission power control according to 3GPP, a transmission power adjustment (interleave power control) is carried out depending upon whether the target SIR is satisfied at each of the base and mobile stations, and control (outer-loop power control) for adjusting the target SIR depending upon the reception quality is performed. However, control is not performed so as to assure the quality of only one of the items of data. Consequently, there are cases where the qualities of both items of data that the mobile station 5 receives from the base stations 3a, 3b are good. In the selective combining method, this represents excessive quality and consumes extra power.

The fifth problem is that radio resources are exhausted. Transmitting a large quantity of data means placing a corresponding limit on spreading code that can be used simultaneously. In the case of orthogonal code used in DS-CDMA, if a short code (Walsh code) used as a channelization code is such that the spreading length (SF) is small, i.e., if a large quantity of data is about to be transmitted, other orthogonal code capable of being used simultaneously is diminished.

There is prior art (JP2000-197095A) in which a base station after handover is selected accurately by a base station controller. In this prior art, each base station detects the reliability of the receive signal based upon the TPC signal and the base station controller selects one base station based upon the reliability of each base station, applies error correction decoding processing to the receive signal that enters from this base station and decides the data.

However, this example of the prior art does not reduce the increase in amount of data and increase in necessary band in the DHO state or SHO state. Further, with this example of the prior art, transmission power is not reduced, there is no improvement in terms of excessive quality and exhausting of radio resources cannot be prevented.

SUMMARY OF THE INVENTION

Accordingly, an object of the present invention is to reduce an increase in amount of data and in the necessary band in the DHO or SHO state.

Another object of the present invention is to reduce transmission power, improve upon excessive quality and prevent exhausting of resources.

A first mode of the present invention is a handover communication method in a mobile communication system having a mobile station, a base station and a base station controller. In this handover communication method, data and an error correction code for this data are transmitted from a transmitting side via separate transmission paths, a receiving side receives this data and the error correction code for this data and subjects the received data to error correction processing using the received error correction code.

A second mode of the present invention is a handover communication method in a mobile communication system having a mobile station, a base station and a base station controller. When a downlink transmission is performed in the handover state, user data from the base station controller is transmitted from a first base station to the mobile station and error correction code for the user data from the base station controller is transmitted from a second base station to the mobile station. The mobile station subjects the received user data to error correction processing using the received error correction code.

A third mode of the present invention is a handover communication method of a mobile communication system having a mobile station, a base station and a base station controller. When an uplink transmission is performed in the handover state, user data is transmitted from the mobile station to a first base station and error correction code for the user data is transmitted from the mobile station to a second base station. The base station controller subjects the user data received from the first and second base stations to error correction processing using the received error correction code.

A fourth mode of the present invention is a handover communication method of a mobile communication system having a mobile station, a sectored base station and a base station controller. When a downlink transmission is performed in the handover state, user data from the base station controller is transmitted from a first sector of the sectored base station to the mobile station and error correction code for the user data from the base station controller is transmitted from a second sector of the sectored base station to the mobile station. The mobile station subjects the received user data to error correction processing using the received error correction code.

A fifth mode of the present invention is a handover communication method of a mobile communication system having a mobile station, a sectored base station and a base station controller. When an uplink transmission is performed in the handover state, user data is transmitted from a mobile station to a first sector of a sectored base station and error correction code for the user data is transmitted from the mobile station to a second sector of the sectored base station. The sectored base station or the base station controller subjects the user data received from the first and second base sectors to error correction processing using the error correction code.

In accordance with the first to fourth modes of the present invention, it will suffice if user data is transmitted via a first transmission path and only error correction code via a second transmission path. As a result, an increase in amount of data and in the necessary band in the DHO or SHO state can be reduced.

In accordance with the first to fourth modes of the present invention, the necessary band can be suppressed and transmission power reduced. In addition, the problem of excessive quality can be improved upon and radio resources can be prevented from being exhausted.

DESCRIPTION OF THE PREFERRED EMBODIMENTS

(A) Principles of the Present Invention

Figure 1:
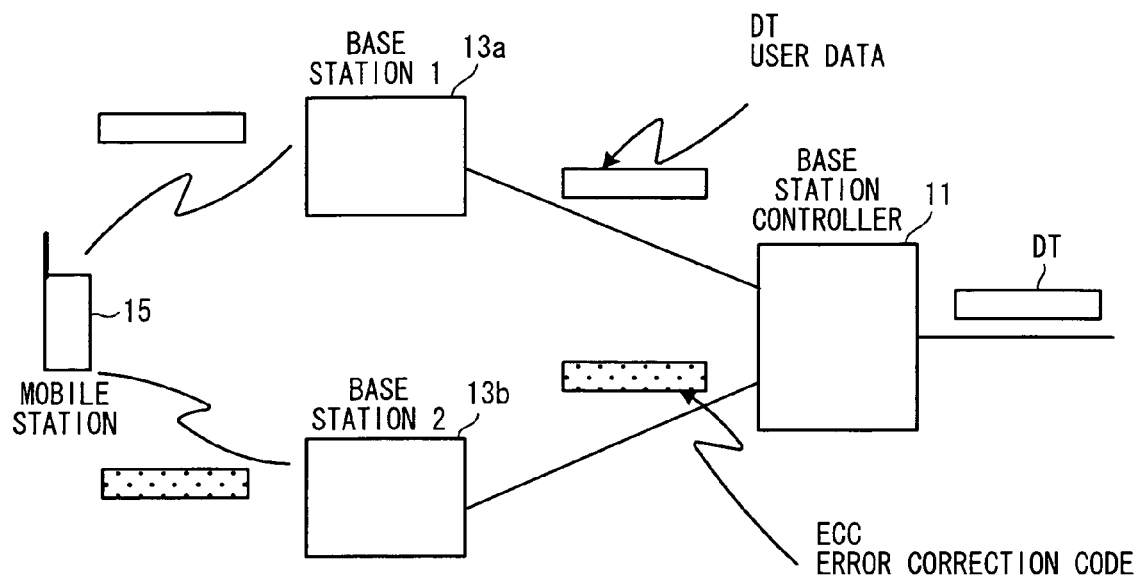
FIG. 1 is a diagram for describing a first principle of the present invention in the DHO state.
Figure 2:
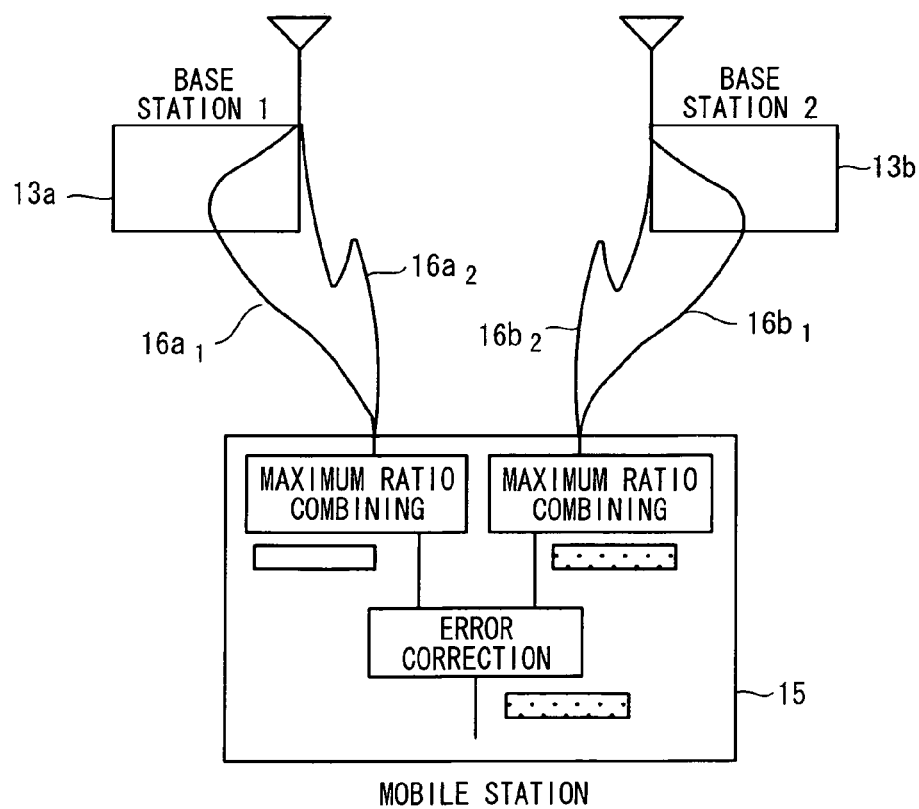
FIG. 2 is a diagram for describing a second principle of the present invention in the DHO state.

FIGS. 1 and 2 are diagrams useful in describing the principles of the present invention in the DHO state. Upon receiving user data DT from a host network in a downlink transmission in the diversity handover (DHO) state, a base station controller 11 executes processing for generating an error correction code. By way of example, the base station controller 11 generates an error correction code ECC such as a Hamming code with respect to the user data, transmits the user data (with the exception of redundant portions) to a first base station 13a and transmits the error correction code ECC (redundant portions) to a second base station 13b. The first base station 13a transmits the user data, which has been received from the base station controller 11, to a mobile station 15, and the second base station 13b transmits the error correction code with respect to the user data received from the base station controller 11 to the mobile station 15. The mobile station 15 subjects the received user data to error correction processing using the received error correction code and decodes the user data. That is, as shown in FIG. 2, the mobile station 15 receives signals from the first base station 13a via multipaths $16a_1, 16a_2, \ldots$, subjects the signals received via these multipaths to maximum-ratio combining and demodulates the user data. Similarly, the mobile station 15 receives signals from the base station 13b via multipaths $16b_1, 16b_2, \ldots$, subjects the signals received via these multipaths to maximum-ratio combining and acquires the error correction code. The mobile station 15 thenceforth subjects the user data to error correction processing using the error correction code and outputs the result of correction.

The foregoing is an example of downlink transmission in the DHO state. However, uplink transmission is merely the reverse of the above processing. That is, the mobile station 15 executes processing to generate an error correction code with regard to the user data. For example, the mobile station 15 generates an error correction code such as a Hamming code with respect to the user data, transmits the user data (with the exception of redundant portions) to the first base station 13a and transmits the error correction code ECC (redundant portions) to the second base station 13b. The first base station 13a receives signals from the mobile station 15 via multipaths, subjects these signals to maximum-ratio combining, decodes the user data and transmits it to the base station controller 11. Similarly, the second base station 13b receives signals from the mobile station 15 via multipaths, subjects these signals to maximum-ratio combining, demodulates the error correction code and transmits it to the base station controller 11. The base station controller 11 subjects the user data to error correction processing using the error correction code and outputs the result of correction (the user data) to the host network.

Figure 3:
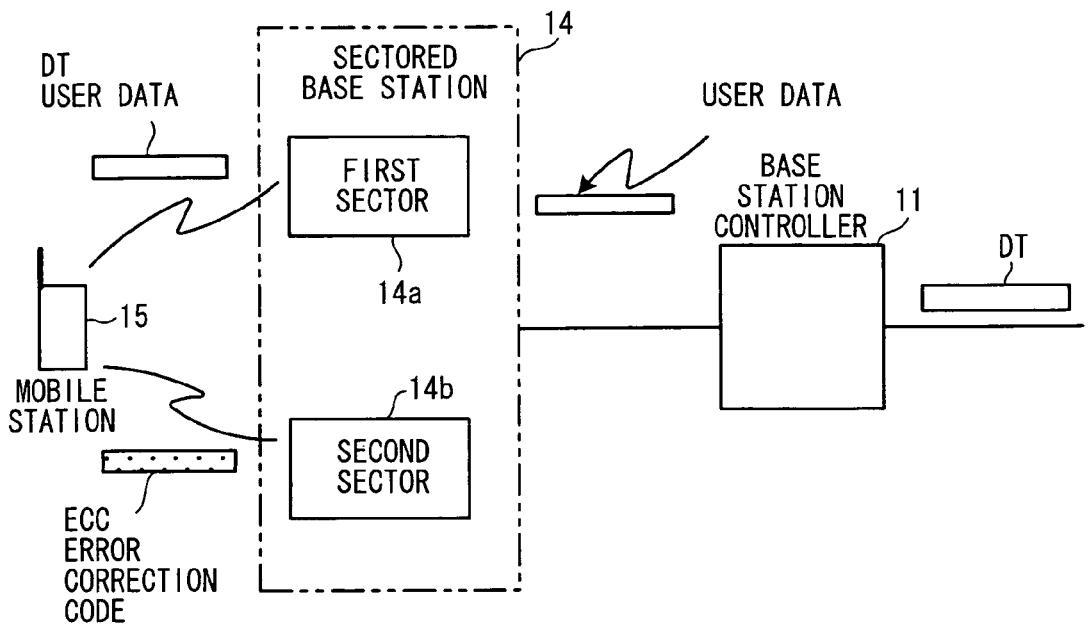
FIG. 3 is a diagram for describing a first principle of the present invention in the SHO state.
Figure 4:
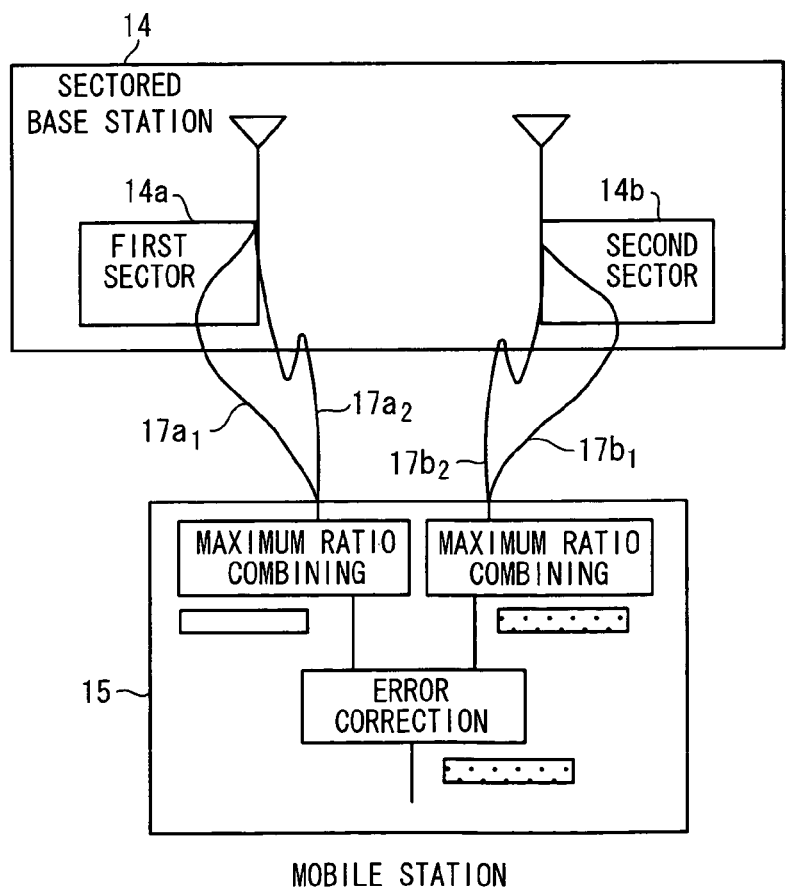
FIG. 4 is a diagram for describing a second principle of the present invention in the SHO state.

FIGS. 3 and 4 are diagrams useful in describing the principles of the present invention in the SHO state. Upon receiving user data DT from a host network in a downlink transmission in the sector handover (SHO) state, the base station controller 11 transmits the user data to a base station 14 that has been divided into sectors (namely a sectored base station). The sectored base station 14 executes processing for generating an error correction code with regard to the user data. For example, the sectored base station 14 generates an error correction code such as a Hamming code with respect to the user data. It will suffice if this is made a block (correction) code. The sectored base station 14 transmits the user data DT to the mobile station 15 via a first sector 14a and transmits the error correction code ECC for the user data to the mobile station 15 via a second sector 14b. The mobile station 15 subjects the received user data to error correction processing using the received error correction code and decodes the user data. That is, as shown in FIG. 4, the mobile station 15 receives signals from the first sector 14a via multipaths $17a_1, 17a_2, \ldots$, subjects the signals received via these multipaths to maximum-ratio combining and demodulates the user data. Similarly, the mobile station 15 receives signals from the second sector 14b via multipaths $17b_1, 17b_2, \ldots$, subjects the signals received via these multipaths to maximum-ratio combining and acquires the error correction code. The mobile station 15 thenceforth subjects the user data to error correction processing using the error correction code and outputs the result of correction.

The foregoing is an example of downlink transmission in the SHO state. However, uplink transmission is merely the reverse of the above processing. That is, the mobile station 15 executes processing to generate an error correction code with regard to the user data. For example, the mobile station 15 generates an error correction code such as a Hamming code with respect to the user data, transmits the user data to the first sector 14a of the sectored base station 14 and transmits the error correction code for the user data to the second sector 14b. The first sector 14a receives signals from the mobile station 15 via multipaths, subjects the signals to maximum-ratio combining and demodulates the user data. Similarly, the second sector 14b receives signals from the mobile station 15 via multipaths, subjects the signals to maximum-ratio combining and demodulates the error correction code. The sectored base station 14 thenceforth subjects the user data to error correction processing using the error correction code and outputs the result of correction (the user data). The base station controller 11 outputs the received user data to the host network.

In the illustration of the second principle above, processing for generating the error correction code is executed by the sectored base station 14 in the SHO downlink transmission. However, it can also be so arranged that the processing for generating the error correction code is executed by the base station controller 11 and the user data and error correction code are sent to the sectored base station 14. Further, error correction processing is executed by the sectored base station 14 in SHO uplink transmission. However, it can also be so arranged that the user data and error correction code are sent to the base station controller 11 and error correction processing executed.

In accordance with the present invention, it will suffice if user data is transmitted via a first transmission path and only error correction code via a second transmission path. As a result, an increase in amount of data and in the necessary band in the DHO or SHO state can be reduced.

Further, in accordance with the present invention, the necessary band can be suppressed and transmission power reduced. Moreover, the problem of excessive quality can be improved upon and radio resources can be prevented from being exhausted.

Figure 5:
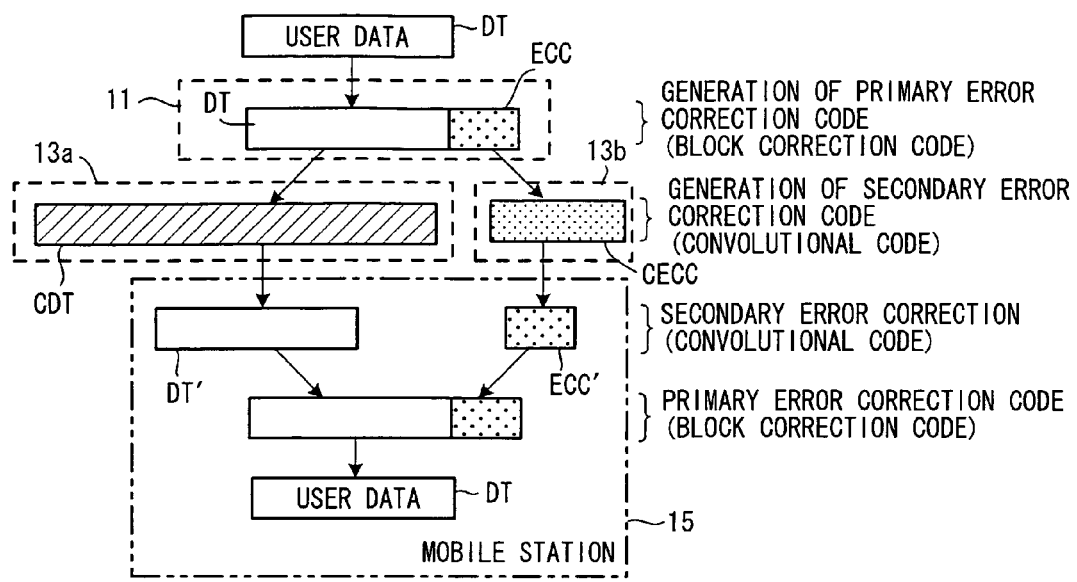
FIG. 5 is a first explanatory view of the present invention for describing the generation of a primary error correction code and secondary error correction code as well as correction processing.
Figure 6:
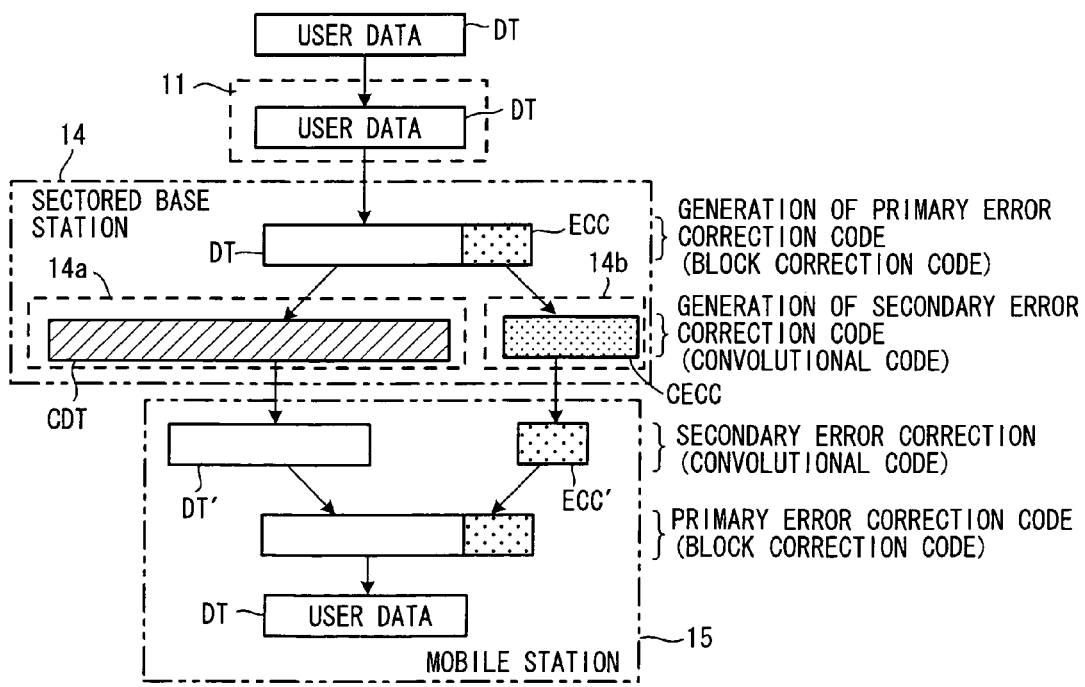
FIG. 6 is a second explanatory view of the present invention for describing the generation of a primary error correction code and secondary error correction code as well as correction processing.
Figure 7:
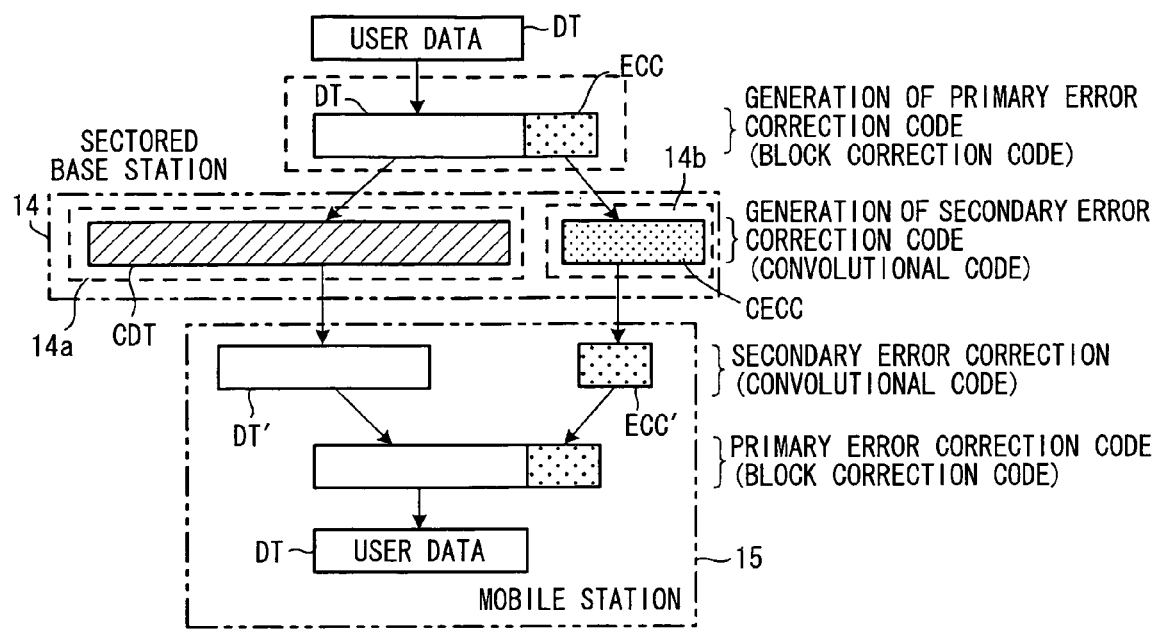
FIG. 7 is a third explanatory view of the present invention for describing the generation of a primary error correction code and secondary error correction code as well as correction processing.

(B) Generation of Primary Error Correction Code and Secondary Error Correction Code, and Correction Processing FIGS. 5 to 7 are diagrams for describing the generation of primary error correction code and secondary error correction code, as well as correction processing. In the description of principles, the generation and appending of primary error correction code such as block code and error correction processing using this primary error correction code have been described. In actuality, however, the generation and appending of secondary error correction code based upon convolutional encoding and error correction processing using this secondary error correction code are also carried out.

FIG. 5 is diagram useful in describing the generation of error correction code and correction processing in downlink transmission in the DHO state. Upon receiving the user data DT from the host network, the base station controller 11 executes processing for generating the primary error correction code. By way of example, the base station controller 11 generates a block correction code such as a Hamming code with respect to the user data, transmits the user data DT to the first base station 13a and transmits the primary error correction code ECC to the second base station 13b. The first base station 13a subjects the user data DT, which has been received from the base station controller 11, to secondary error correction encoding processing such as convolutional encoding and transmits the encoded data CDT obtained to the mobile station 15. The second base station 13b subjects the primary error correction code ECC, which has been received from the base station controller 11, to secondary error correction encoding processing such as convolutional encoding and transmits the encoded primary error correction code CECC obtained to the mobile station 15. The mobile station 15 subjects the encoded data CDT received to secondary error correction processing to decode user data DT' and subjects the encoded primary error correction code CECC received to secondary error correction processing to decode primary error correction code ECC'. The mobile station 15 then subjects the user data DT' obtained by the secondary error correction to error correction processing using the primary error correction code ECC' and decodes the user data DT.

It should be noted that by transmitting the user data DT to the first base station 13a and transmitting the primary error correction code ECC to the second base station 13b, the information that is transmitted between each base station controller and base station is reduced in comparison with transmitting DT+ECC. This is an advantage. A further advantage is that the processing for generating ECC in the base station controller is distributed when the user data DT is sent to each base station, one base station sends the user data DT to the mobile station and the other base station generates the primary error correction code ECC from the user data DT and sends it to the mobile station. It should be noted that at this time the base station controller can transmit information for designating the base station that transmits the primary error correction code ECC, and the base station can operate in accordance with the designation.

The foregoing is for the case of downlink transmission in the DHO state. Uplink transmission also is performed in similar fashion.

FIG. 6 is diagram useful in describing the generation of error correction code and correction processing in downlink transmission in the SHO state. Upon receiving the user data DT from the host network, the base station controller 11 transmits this user data to the sectored base station 14. The latter executes processing to generate the primary error correction code with regard to the user data. For example, the mobile station 15 generates a block correction code such as a Hamming code with respect to the user data, inputs the user data DT to the first sector 14a and inputs the primary error correction code ECC to the second sector 14b. The first sector 14a subjects the input user data DT to secondary error correction encoding processing such as convolutional encoding and transmits the encoded data CDT obtained to the mobile station 15. The second sector 14b subjects the input primary error correction code ECC to secondary error correction encoding processing such as convolutional encoding and transmits the encoded primary error correction code CECC obtained to the mobile station 15. The mobile station 15 subjects the encoded data CDT received to secondary error correction processing to decode user data DT' and subjects the encoded primary error correction code CECC received to secondary error correction processing to decode primary error correction code ECC'. The mobile station 15 then subjects the user data DT' obtained by the secondary error correction to error correction processing using the primary error correction code ECC' and decodes the user data DT. The foregoing is for the case of downlink transmission in the SHO state. Uplink transmission also is performed in similar fashion.

FIG. 7 is another diagram useful in describing the generation of error correction code and correction processing in downlink transmission in the SHO state. The processing for generating the primary error correction code in the base station controller 11 differs from that of FIG. 6.

Upon receiving the user data DT from the host network, the base station controller 11 executes processing to generate the primary error correction code. For example, the base station controller 11 generates a block correction code such as a Hamming code with respect to the user data, transmits the user data DT to the first sector 14a of sectored base station 14 and transmits the primary error correction code ECC to the second sector 14b.

The first sector 14a of sectored base station 14 subjects the input user data DT to secondary error correction encoding processing such as convolutional encoding and transmits the encoded data CDT obtained to the mobile station 15. The second sector 14b subjects the input primary error correction code ECC to secondary error correction encoding processing such as convolutional encoding and transmits the encoded primary error correction code CECC obtained to the mobile station 15. The mobile station 15 subjects the encoded data CDT received to secondary error correction processing to decode user data DT' and subjects the encoded primary error correction code CECC received to secondary error correction processing to decode primary error correction code ECC'. The mobile station 15 then subjects the user data DT' obtained by the secondary error correction to error correction processing using the primary error correction code ECC' and decodes the user data DT. The foregoing is for the case of downlink transmission in the SHO state. Uplink transmission also is performed in similar fashion.

(C) Structure of Mobile Station

Figure 8:
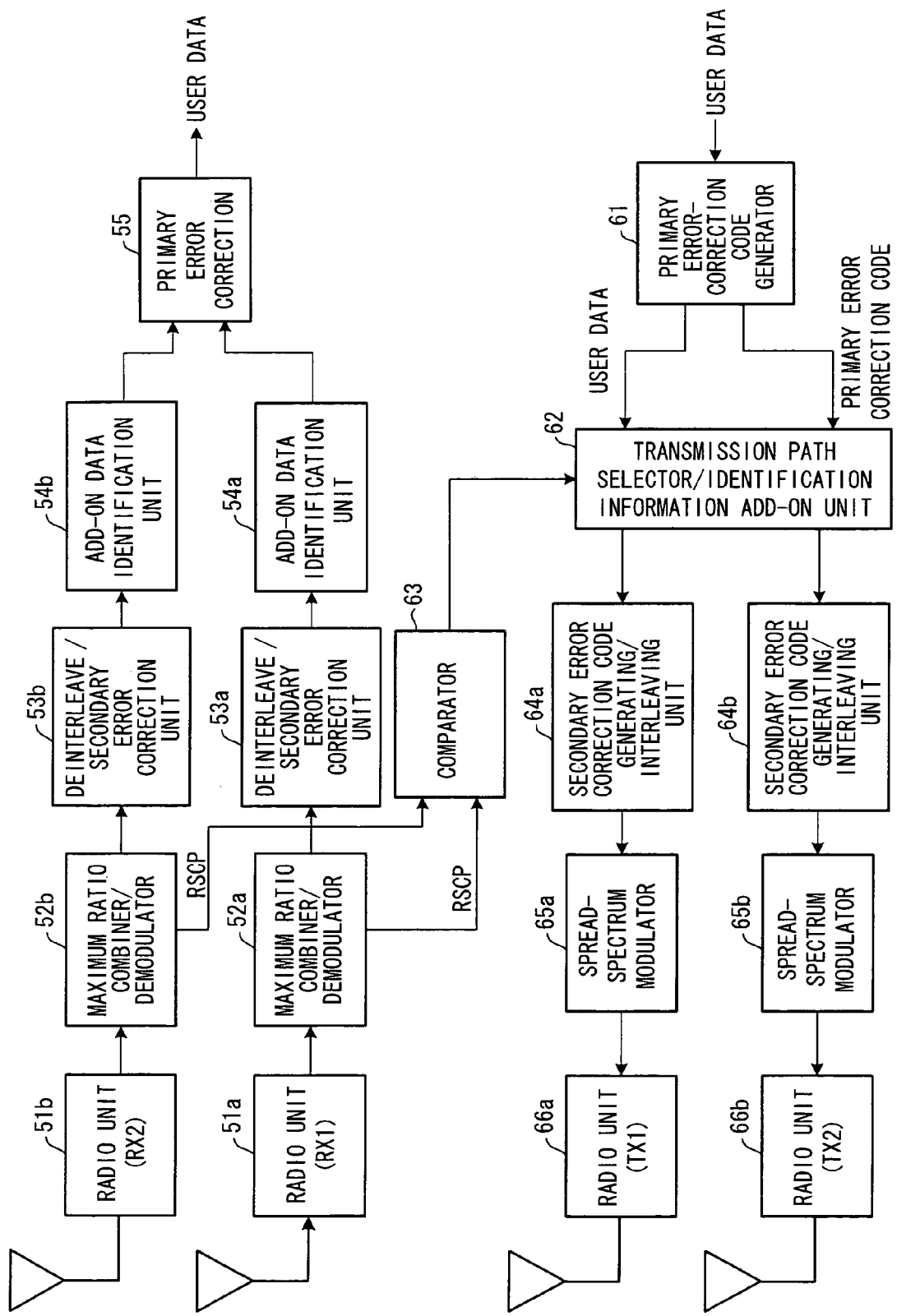
FIG. 8 is a block diagram of a mobile station having transceivers in two channels.

FIG. 8 is a block diagram of a mobile station, which is equipped with transceivers in two channels. Radio units 51a, 51b in first and second receivers receive signals from a base station and apply a frequency conversion and orthogonal demodulation to convert the signals to baseband signals. Maximum ratio combiners/demodulators 52a, 52b subject the receive signals to despread processing to demodulate them for every path of multipaths, subject the results of demodulation to maximum ratio combining and output the resultant signals. Deinterleave/secondary error correction units 53a, 53b subject the demodulated data to deinterleave processing and then execute secondary error correction processing. Data/primary error correction code identification units 54a, 54b identify whether the receive signals are user data or primary error correction code based upon add-on data identification information that has been mapped to DPCCH, and input the results of identification to a primary error correction unit 55. The latter subjects the user data that has undergone the secondary error correction to primary error correction processing using the primary error correction code and then outputs the user data.

On the receiving side, a primary error correction code generator 61 executes processing for generating the primary error correction code with regard to user data and inputs the result to a transmission path selector/identification information add-on unit 62. A comparator 63 inputs the result of a size comparison between RSCPs [Received Signal Code Power (dBm)] of desired waves, which enter from the maximum ratio combiners/demodulators 52a, 52b, to the transmission path selector/identification information add-on unit 62. The latter assigns the primary error correction code to first and second transmitting sides based upon the result of the size comparison. That is, the transmission path selector/identification information add-on unit 62 assigns the user data and primary error correction code to the first and second transmitting sides so as to transmit the user data via the transmission path having the larger RSCP (the best radio transmission path) and transmit the primary error correction code via the transmission path of the smaller RSCP.

First and second secondary error correction code generating/interleaving units 64a, 64b subject the input data to convolutional encoding processing (secondary error correction encoding processing) and then apply interleave processing and input the results to spread-spectrum modulators 65a; 65b. The latter subject the input data to spread-spectrum modulation processing. Radio units 66a, 66b subject the spread-spectrum-modulated signals to processing such as orthogonal modulation, frequency conversion and power amplification and transmit the resultant signals to a base station from antennas. It should be noted that the circuits 51a to 54a on the first receiving side and the circuits 64a to 66a on the first transmitting side construct a first transceiver and that the circuits 51b to 54b on the second receiving side and the circuits 64b to 66b on the second transmitting side construct a second transceiver.

(D) First Embodiment (a) Downlink Communication in DHO State

Figure 9:
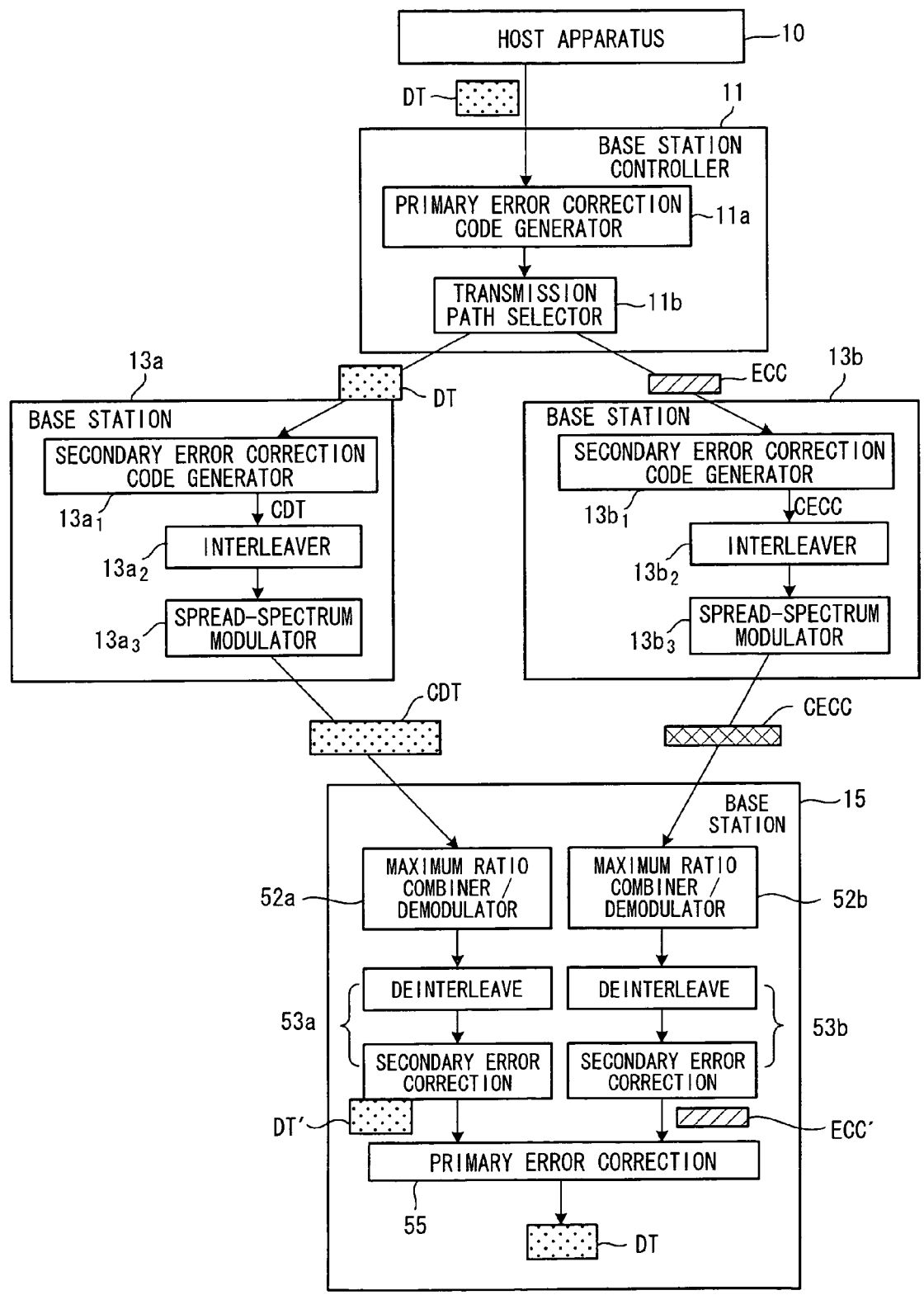
FIG. 9 is a diagram useful in describing an embodiment of downlink communication in the DHO state.

FIG. 9 is a diagram useful in describing an embodiment of downlink communication in the DHO state.

Upon receiving user data DT from a host apparatus 10, a primary error correction code generator 11a of the base station controller 11 executes processing for generating the primary error correction code. For example, the primary error correction code generator 11a generates a block correction code such as a Hamming code with regard to the user data. A transmission path selector 11b sends the user data to the best radio transmission path, e.g., to the transmission path through the first base station 13a, and sends the primary error correction code ECC to the other radio transmission path, i.e., the transmission path through the second base station 13b.

A secondary error correction code generator 13a, of the first base station 13a subjects user data DT received from the base station controller 11 to secondary error correction encoding processing such as convolutional encoding, an interleaver $13a_2$ subjects this encoded data CDT to interleave processing, and a spread-spectrum modulator $13a_3$ subjects the encoded data to spread-spectrum modulation and transmits the result to the mobile station 15.

A secondary error correction code generator $13b_1$ of the second base station 13b subjects primary error correction code ECC received from the base station controller 11 to secondary error correction encoding processing such as convolutional encoding, an interleaver $13b_2$ subjects this encoded data CECC to interleave processing, and a spread-spectrum modulator $13b_3$ subjects the encoded data to spread-spectrum modulation and transmits the result to the mobile station 15.

In the mobile station 15, maximum ratio combiners/demodulators 52a, 52b receive signals via multipaths, subject the signals received via the multipaths to maximum ratio combining and demodulate the signals. Next, deinterleave/ secondary error correction units 53a, 53b subject the demodulated data to deinterleave processing and secondary error correction processing successively and restore the user data DT' and primary error correction code ECC'. A primary error correction unit 55 subsequently subjects the user data DT' to error correction processing using the error correction code ECC' and outputs the user data DT that has undergone the error correction.

(b) Uplink Communication in DHO State

Figure 10:
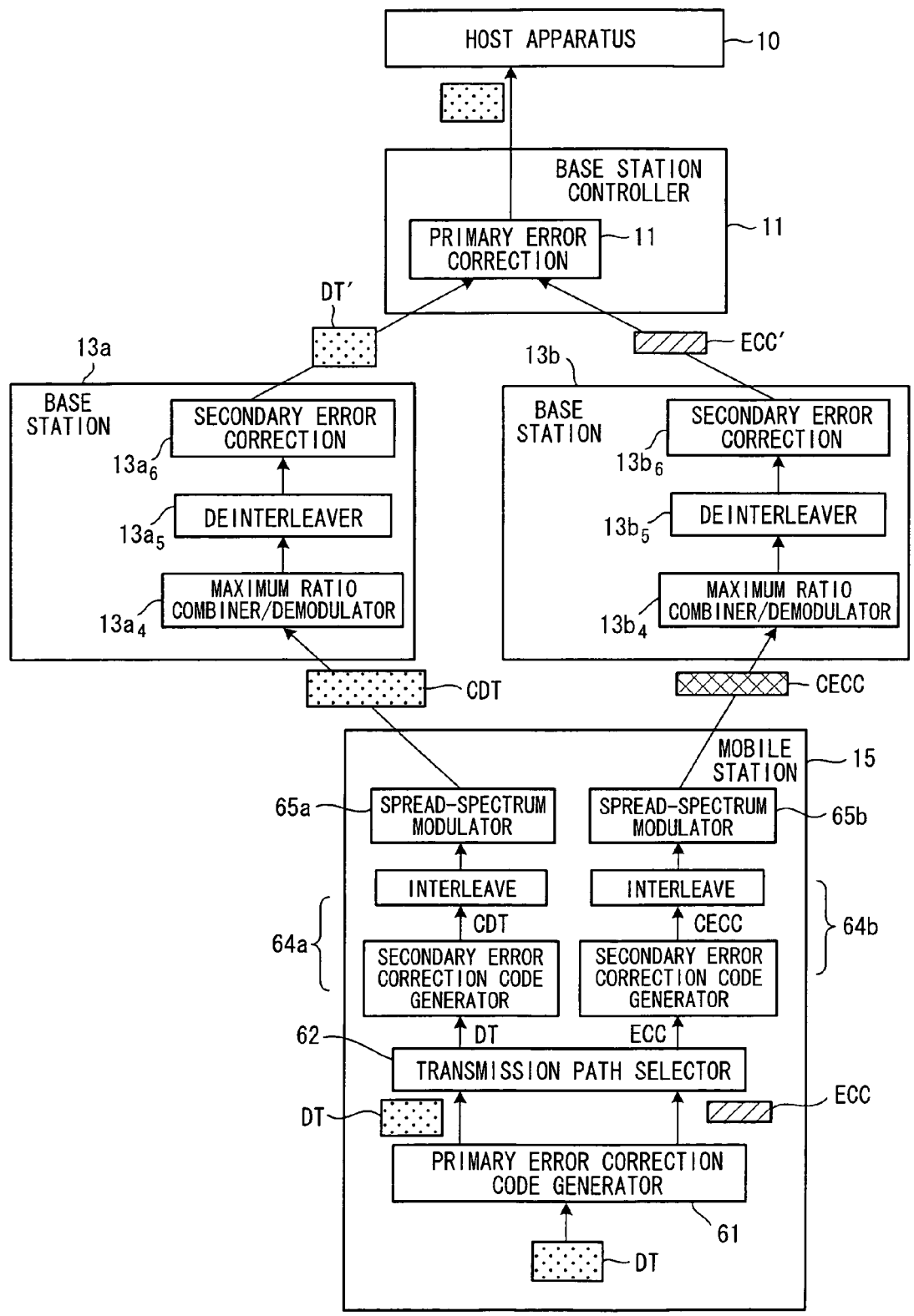
FIG. 10 is a diagram useful in describing an embodiment of uplink communication in the DHO state.

FIG. 10 is a diagram useful in describing an embodiment of uplink communication in the DHO state.

Figure 11:
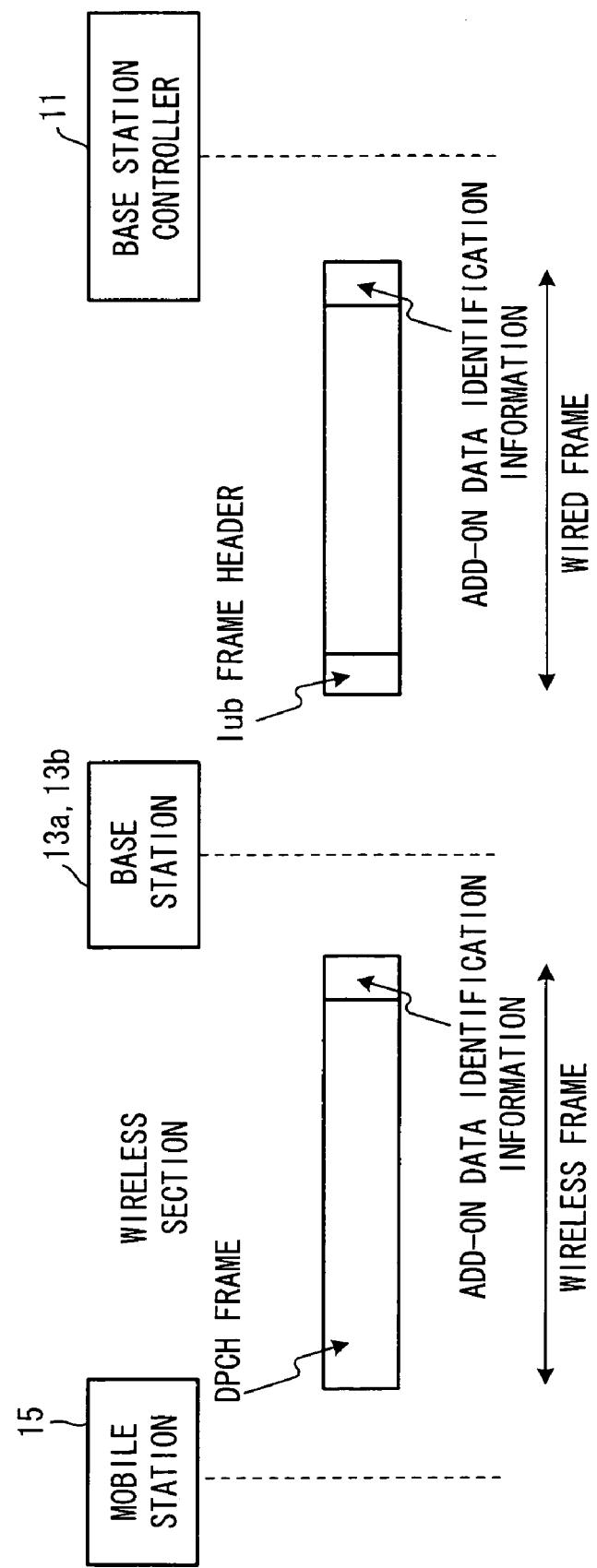
FIG. 11 is a diagram useful in describing a method of identifying add-on data.

A primary error correction code generator 61 of the mobile station 15 executes processing for generating the primary error correction code with regard to the user data DT. The transmission path selector/identification information add-on unit 62 sends the user data DT to the best radio transmission path, e.g., to the transmitting side of the first base station 13a, and sends the primary error correction code ECC to the other radio transmission path, i.e., to the transmitting side of the second base station 13b. At this time the transmission path selector/identification information add-on unit 62 maps the add-on data identification information to a suitable location of the DPCCH. FIG. 11 is a diagram useful in describing a method of identifying the add-on data. An add-on data identification information field is provided in a DPCCH frame from the mobile station 15 to the base stations 13a, 13b, and add-on data identification information (0: primary error correction code; 1: user data) is placed in this field.

The secondary error correction code generating/interleaving units 64a, 64b subject the input user data and primary error correction code DT, ECC to secondary error correction encoding processing such as convolutional encoding and then apply interleave processing to the encoded data CDT and encoded primary error correction code CECC and input the results to the spread-spectrum modulators 65a, 65b. The latter subject the encoded data to spread-spectrum modulation and transmit the results to the first and second base stations 13a, 13b.

Maximum ratio combiners/demodulators $13b_4$, $13a_4$ of the first and second base stations 13a, 13b receive signals via multipaths, subject the signals received via the multipaths to maximum ratio combining and demodulate the signals. Deinterleavers $13a_5$, $13b_5$ then subject the demodulated data to deinterleave processing, and secondary error code correction units $13a_6$, $13b_6$ subject the results of deinterleaving to secondary error correction processing, restore the user data DT' and primary error correction code ECC' and transmit these to the base station controller 11. At this time the first and second base stations 13a, 13b map add-on data identification information to a suitable location of the Iub frame. FIG. 11 is a diagram useful in describing a method of identifying the loaded data. An add-on data identification information field is provided in an Iub uplink frame from the base stations 13a, 13b to the base station controller 11, and add-on data identification information (0: primary error correction code; 1: user data) is placed in this field.

Upon receiving the user data DT' and primary error correction code ECC', the primary error correction unit 11c of the base station controller 11 subjects the user data DT' to error correction processing using the error correction code ECC', generates the user data DT that has undergone the error correction and inputs the data to the host apparatus 10.

(E) Second Embodiment (a) Downlink Communication in SHO State

Figure 12:
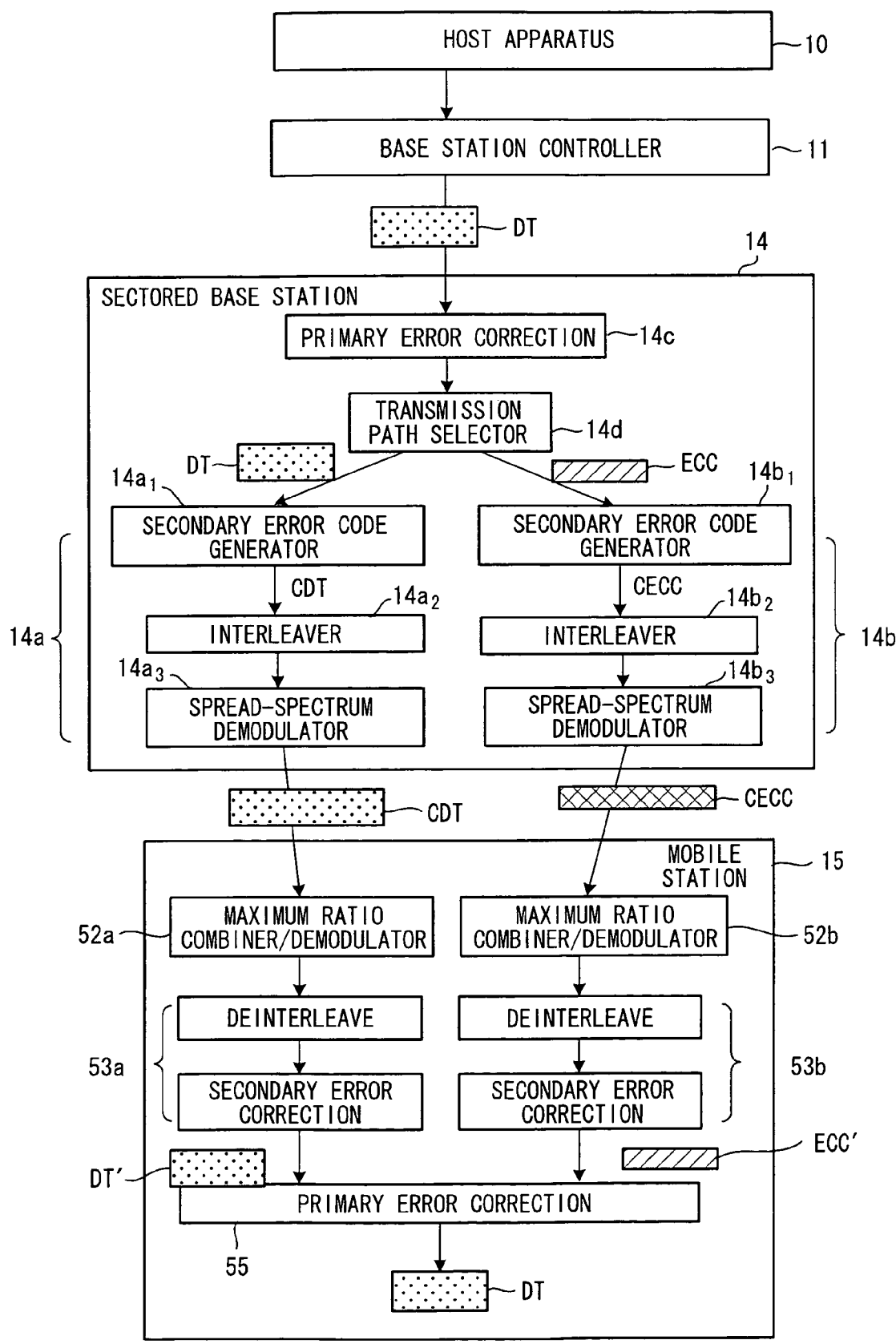
FIG. 12 is a diagram useful in describing an embodiment of downlink communication in the SHO state.

FIG. 12 is a diagram useful in describing an embodiment of downlink communication in the SHO state.

Upon receiving user data DT from the base station controller 11, a primary error correction code generator 14c of the sectored base station 14 executes processing for generating the primary error correction code. For example, a transmission path selector 14d sends the user data to the best radio transmission path, e.g., to the side of the first sector 14a, and sends the primary error correction code ECC to the side of the second sector.

A secondary error correction code generator $14a_1$ of the first sector 14a subjects the input user data DT to secondary error correction encoding processing such as convolutional encoding, an interleaver $14a_2$ subjects this encoded data CDT to interleave processing, and a spread-spectrum modulator $14a_3$ subjects the encoded data to spread-spectrum modulation and transmits the result to the mobile station 15.

A secondary error correction code generator $14b_1$ of the second sector 14b subjects the input primary error correction code ECC to secondary error correction encoding processing such as convolutional encoding, an interleaver $14b_2$ subjects this encoded primary error correction code CECC to interleave processing, and a spread-spectrum modulator $14b_3$ subjects the interleaved primary error correction code CECC data to spread-spectrum modulation and transmits the result to the mobile station 15.

In the mobile station 15, the maximum ratio combiners/demodulators 52a, 52b receive signals via multipaths, subject the signals received via the multipaths to maximum ratio combining and demodulate the signals. Next, the deinterleave/secondary error correction units 53a, 53b subject the demodulated data to deinterleave processing and secondary error correction processing successively and restore the user data DT' and primary error correction code ECC'. The primary error correction unit 55 subsequently subjects the user data DT' to error correction processing using the error correction code ECC' and outputs the user data DT that has undergone the error correction.

(b) Uplink Communication in SHO State

Figure 13:
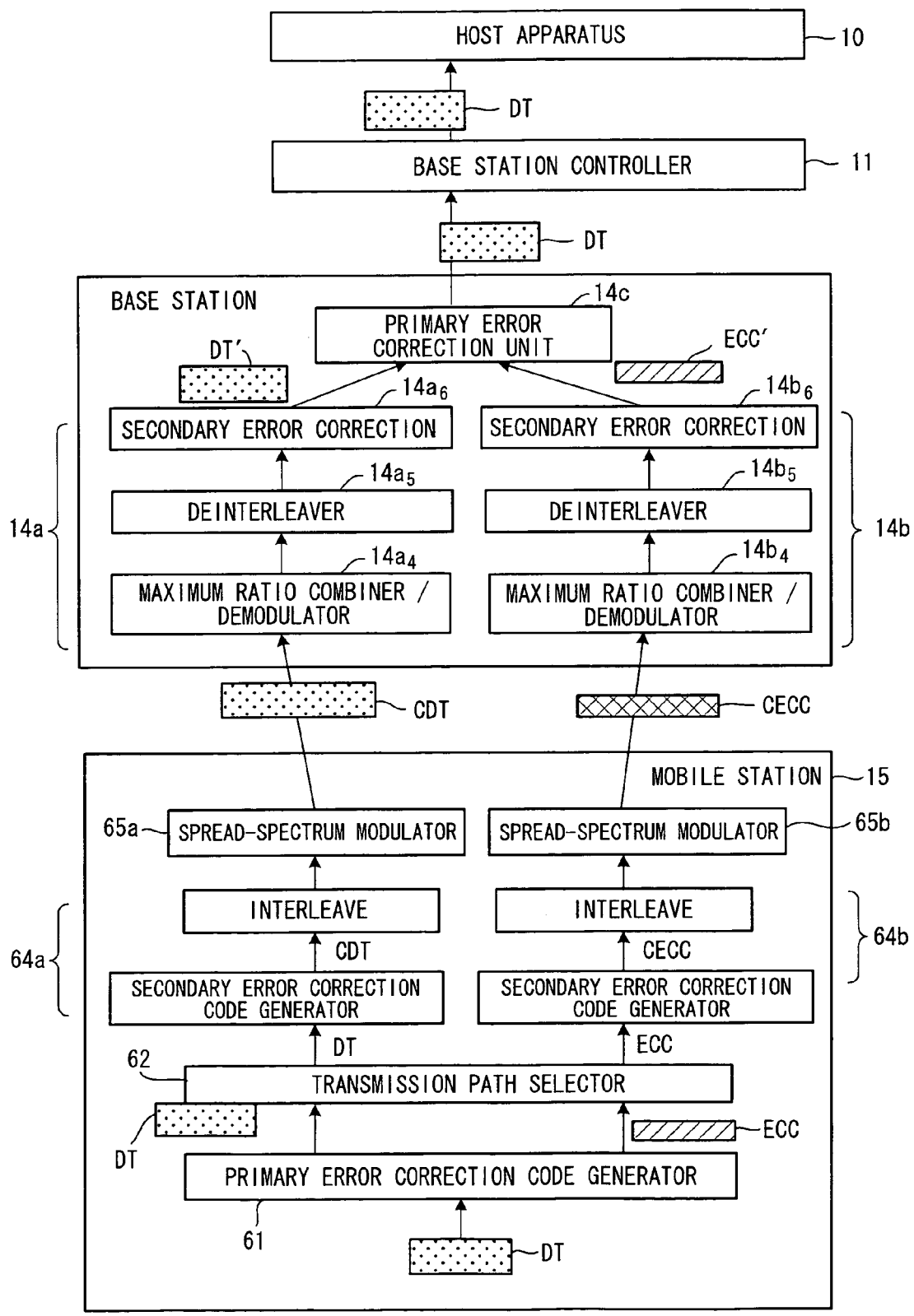
FIG. 13 is a diagram useful in describing an embodiment of uplink communication in the SHO state.

FIG. 13 is a diagram useful in describing an embodiment of uplink communication in the SHO state.

The primary error correction code generator 61 of the mobile station 15 executes processing for generating the primary error correction code with regard to the user data DT.

The transmission path selector/identification information add-on unit 62 sends the user data DT to the best radio transmission path, e.g., to the transmitting side of the first sector 14a, and sends the primary error correction code ECC to the transmitting side with respect to the second sector 14b. The transmission path selector/identification information add-on unit 62 maps the loaded-data identification information to a suitable location of the DPCCH (see FIG. 11).

The secondary error correction code generating/interleaving units 64a, 64b subject the input user data DT and primary error correction code ECC to secondary error correction encoding processing such as convolutional encoding and then apply interleave processing to the encoded data CDT and encoded primary error correction code CECC and input the results to the spread-spectrum modulators 65a, 65b. The latter subject the encoded data to spread-spectrum modulation and transmit the results to the sectored base station 14.

Maximum ratio combiners/demodulators $14a_4$, $14b_4$ of the first sector 14a of sectored base station 14 receive signals via multipaths, subject the signals received via the multipaths to maximum ratio combining and demodulate the signals. Deinterleavers $14a_5$, $14b_5$ then subject the demodulated data to deinterleave processing, and secondary error code correction units $14a_6$, $14b_6$ subject the results of deinterleaving to secondary error correction processing, restore the user data DT' and primary error correction code ECC' and input these to a primary error correction unit 14e. The latter subjects the user data DT' to error correction processing using the error correction code ECC', generates the user data DT that has undergone the error correction and transmits this data to the base station controller 11. The latter sends the user data to the host apparatus 10.

(F) Third Embodiment (a) Downlink Communication in SHO State

Figure 14:
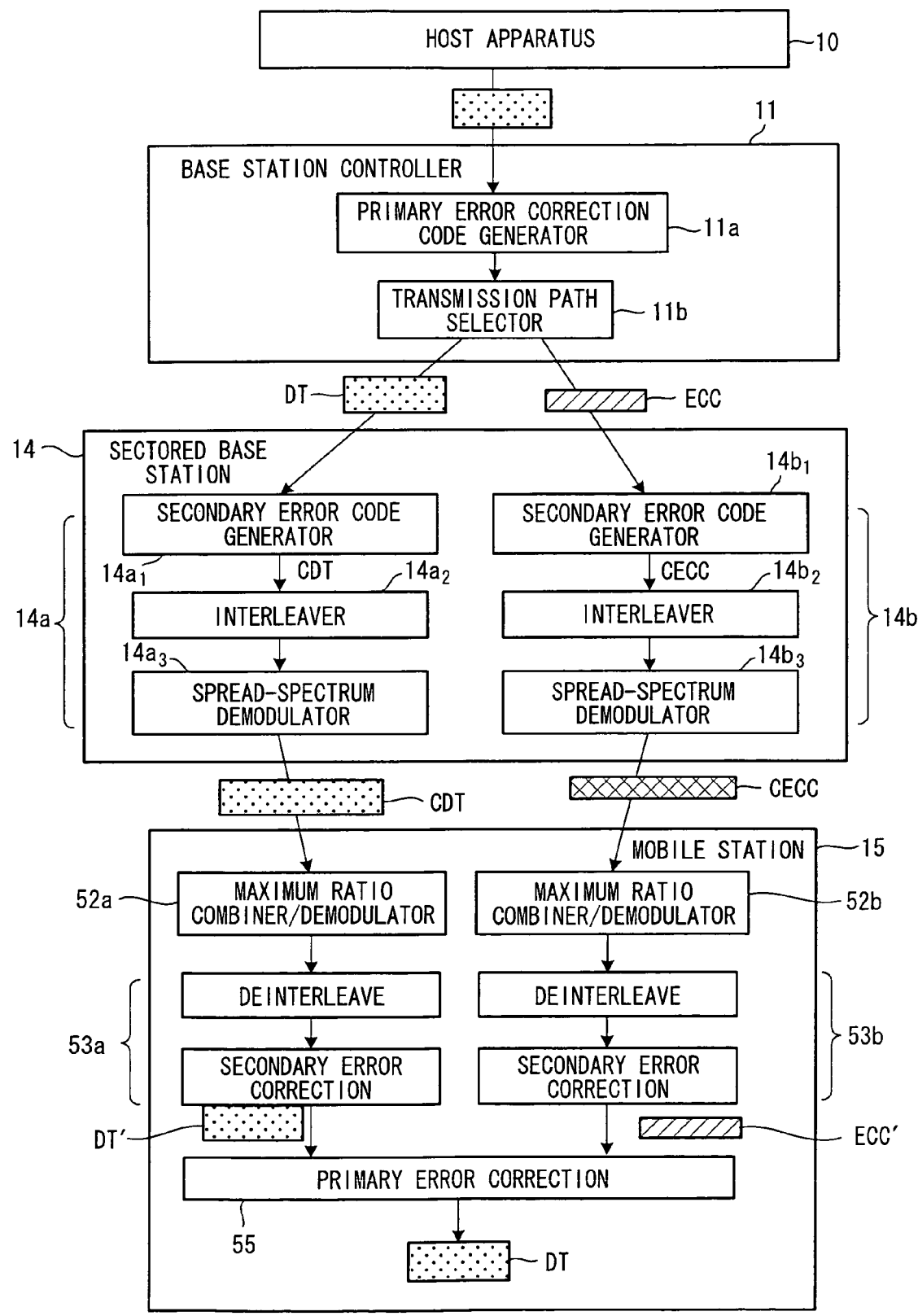
FIG. 14 is a diagram useful in describing another embodiment of downlink communication in the SHO state.

FIG. 14 is a diagram useful in describing another embodiment of downlink communication in the SHO state. This differs from the second embodiment (FIG. 12) in that primary error correction code generation processing is executed in the base station controller.

Upon receiving user data DT from the host apparatus 10, the primary error correction code generator 11a of the base station controller 11 executes processing for generating the primary error correction code. For example, the transmission path selector lib sends the user data DT to the best radio transmission path, e.g., to the transmission path through the first sector 14a of the sectored base station 14, and sends the primary error correction code ECC to the other radio transmission path, i.e., to the transmission path through the second sector 14b.

The secondary error correction code generator 14a, of the first sector 14a of sectored base station 14 subjects the user data DT received from the base station controller 11 to secondary error correction encoding processing such as convolutional encoding, the interleaver $14a_2$ subjects this encoded data CDT to interleave processing, and the spread-spectrum modulator $14a_3$ subjects the encoded data to spread-spectrum modulation and transmits the result to the mobile station 15.

The secondary error correction code generator 14b, of the second sector 14b subjects the primary error correction code ECC received from the base station controller 11 to secondary error correction encoding processing such as convolutional encoding, the interleaver $14b_2$ subjects this encoded data CECC to interleave processing, and the spread-spectrum modulator $14b_3$ subjects the encoded data to spread-spectrum modulation and transmits the result to the mobile station 15.

In the mobile station 15, the maximum ratio combiners/demodulators 52a, 52b receive signals via multipaths, subject the signals received via the multipaths to maximum ratio combining and demodulate the signals. Next, the deinterleave/secondary error correction units 53a, 53b subject the demodulated data to deinterleave processing and secondary error correction processing successively and restore the user data DT' and primary error correction code ECC'. The primary error correction unit 55 subsequently subjects the user data DT' to error correction processing using the error correction code ECC' and outputs the user data DT that has undergone the error correction.

(b) Uplink Communication in SHO State

Figure 15:
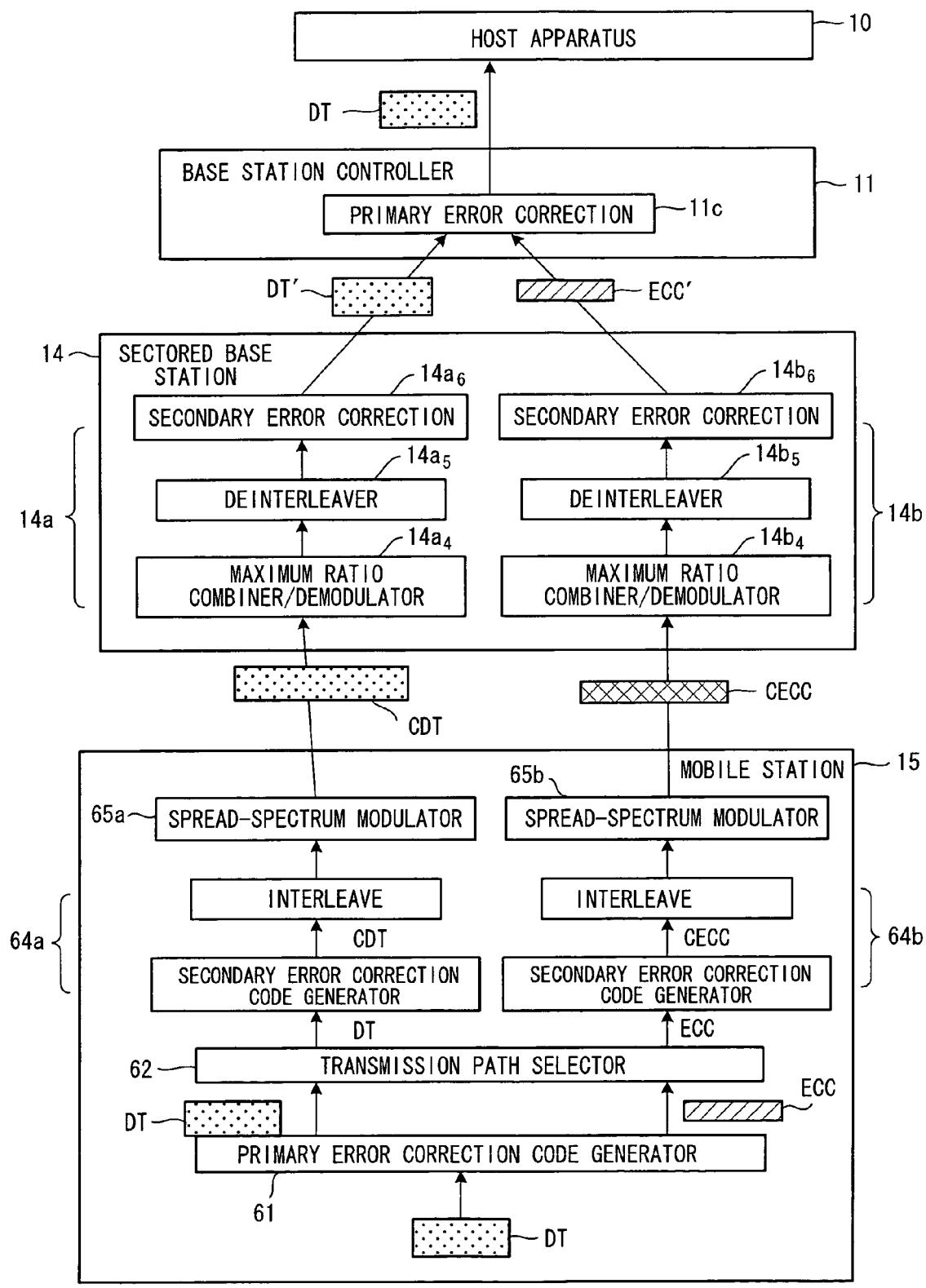
FIG. 15 is a diagram useful in describing another embodiment of uplink communication in the SHO state.

FIG. 15 is a diagram useful in describing another embodiment of uplink communication in the SHO state. This differs from the second embodiment (FIG. 13) in that primary error correction code generation processing is executed in the base station controller.

The primary error correction code generator 61 of the mobile station 15 executes processing for generating the primary error correction code with regard to the user data DT. The transmission path selector/identification information add-on unit 62 sends the user data DT to the best radio transmission path, e.g., to the side of the first sector 14a of sectored base station 14, and sends the primary error correction code ECC to the side of the second sector 14b. The transmission path selector/identification information add-on unit 62 maps the add-on data identification information to a suitable location of the DPCCH (see FIG. 11).

The secondary error correction code generating/interleaving units 64a, 64b subject the input user data DT and primary error correction code ECC to secondary error correction encoding processing such as convolutional encoding and then apply interleave processing to the encoded data CDT and encoded primary error correction code CECC and input the results to the spread-spectrum modulators 65a, 65b. The latter subject the encoded data to spread-spectrum modulation and transmit the results to the first and second sectors of the sectored base station 14.

Maximum ratio combiners/demodulators $14a_4$, $14b_4$ of the first and second sectors 14a, 14b of sectored base station 14 receive signals via multipaths, subject the signals received via the multipaths to maximum ratio combining and demodulate the signals. Deinterleavers $14a_5$, $14b_5$ then subject the demodulated data to deinterleave processing, and secondary error code correction units $14a_6$, $14b_6$ subject the results of deinterleaving to secondary error correction processing, restore the user data DT' and primary error correction code ECC' and transmit these to the primary error correction unit 11c of the base station controller 11.

The primary error correction unit 11c of the base station controller 11 subjects the user data DT' to error correction processing using the error correction code ECC', generates the user data DT that has undergone the error correction and transmits this data to the host apparatus 10.

(G) Method of Determining Best Radio Transmission Path

In the first to third embodiments, user data that has undergone convolutional encoding (secondary error correction encoding) is transmitted on the best radio transmission path and the primary error correction code is transmitted on other transmission paths. The reason for this is that even if the primary error correction code becomes so erroneous that restoration is impossible, the user data can be restored so long as the user data, which has undergone convolutional encoding, can be received within limits in which error correction is possible. This means that it is necessary to discriminate the best radio transmission path.

Figure 16:
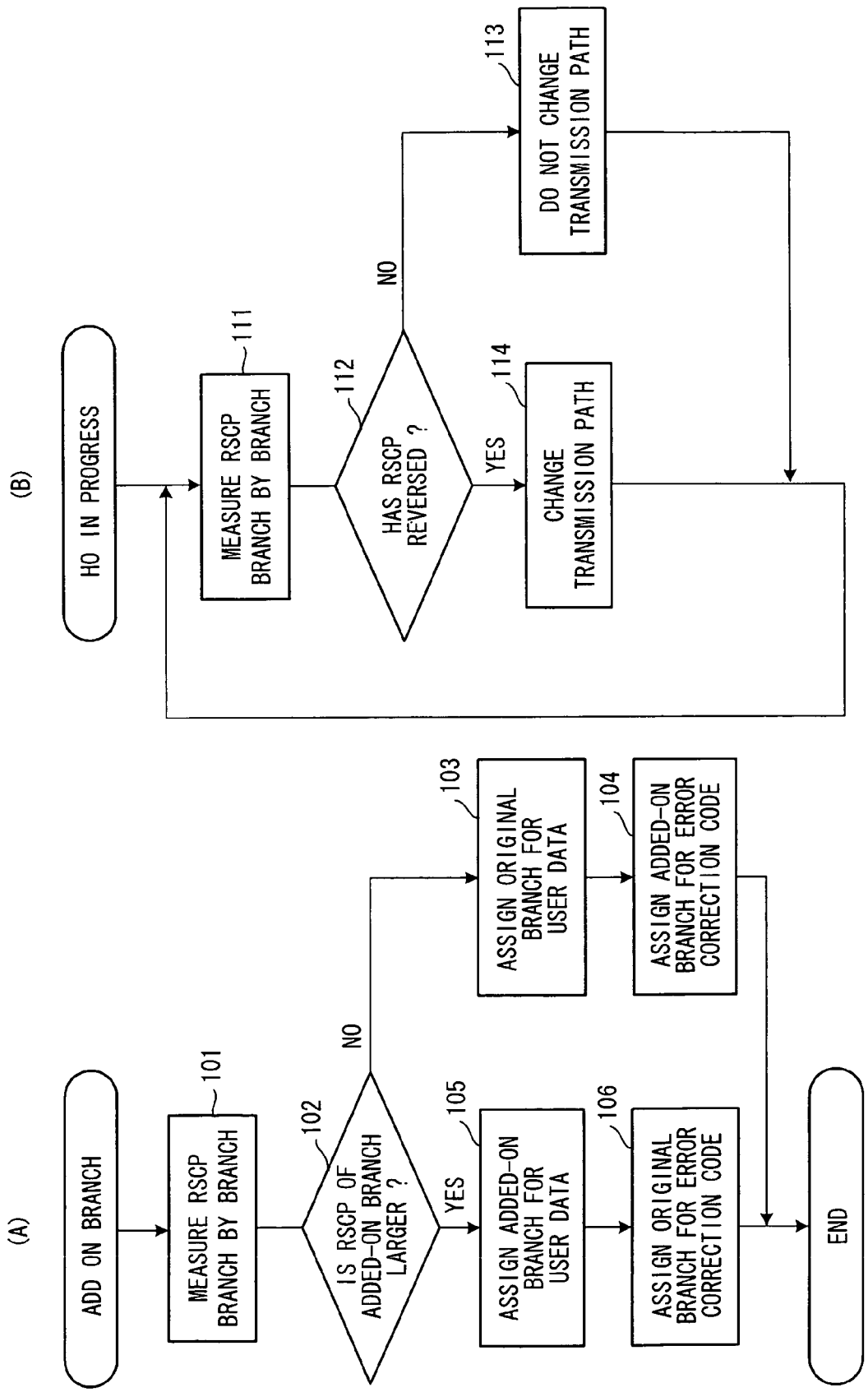
FIG. 16 illustrates a flowchart of a decision method using RSCP that decides the best uplink radio transmission path at a mobile station, and a flowchart of a path changeover method.

(a) Method of Deciding Best Uplink Radio Transmission Path of Mobile Station, and Method of Changing Over Path FIG. 16 illustrates a flowchart of a decision method for deciding the best uplink radio transmission path at a mobile station using RSCP (Received Strength Code Power), and a flowchart of a path changeover method. Although processing at the mobile station 15 (FIG. 8) is described below, the best radio transmission path can be decided and changed over by similar processing at each of the nodes.

If the handover state is attained and a new branch (transmission path) is added on [(A) of FIG. 16], RSCP measurement units (not shown) of the maximum ratio combiners/demodulators 52a, 52b measure the RSCPs on per-branch (transmission path) basis and input the results of measurement to the comparator 63 (step 101). It should be noted that in a 3GPP system, the RSCP of the CPICH (common pilot channel) of the downlink signal that exists in a sector or cell scheduled for addition is measured before addition of the branch and the adding on of the branch is triggered in response to the measured RSCP surpassing a set value. When the branch is added on, information relating to the DPCH (dedicated physical channel) to be added on is still not in possession. Because the channel is CPICH, therefore, the information is represented by the RSCP.

The comparator 63 compares the two signals in terms of size and inputs the result of the comparison to the transmission path selector/identification information add-on unit 62 (step 102). If the RSCP of the branch added on is smaller, then the transmission path selector/identification information add-on unit 62 assigns the branch thus far for transmission of the user data (step 103), assigns the added-on branch for the primary error correction code (step 104) and outputs the user data DT and primary error correction code ECC to the corresponding sides. On the other, if the RSCP of the branch added on is larger, then the transmission path selector/identification information add-on unit 62 assigns the added-on branch for transmission of the user data (step 105), assigns the branch thus for the primary error correction code (step 106) and outputs the user data DT and primary error correction code ECC to the corresponding sides.

The processing shown at (B) of FIG. 16 thenceforth continues in the handover state. That is, the maximum ratio combiners/demodulators 52a, 52b measure the RSCP of the DPCH on a per-branch basis and input the results of measurement to the comparator 63 (step 111). The comparator 63 compares the two signals in terms of size and inputs the result of the comparison to the transmission path selector/identification information add-on unit 62. The latter checks to determine whether the size relationship of the RSCPs has reversed (step 112). If the relationship has not reversed, then the transmission path selector/identification information add-on unit 62 maintains and does not change the transmission paths assigned thus far for the user data and primary error correction code (step 113). If the relationship has reversed, however, then the transmission path selector/identification information add-on unit 62 changes over the transmission paths assigned for the user data and primary error correction code (step 114) and selectively outputs the user data DT and primary error correction code ECC to the corresponding sides.

Although a case in which there are two branches is described above, the present invention is applicable also to a case where there are three or more branches. In such case the branch of the largest RSCP is adopted as the branch for transmission of user data and the other branches are adopted for transmission of the primary error correction code.

Figure 17:
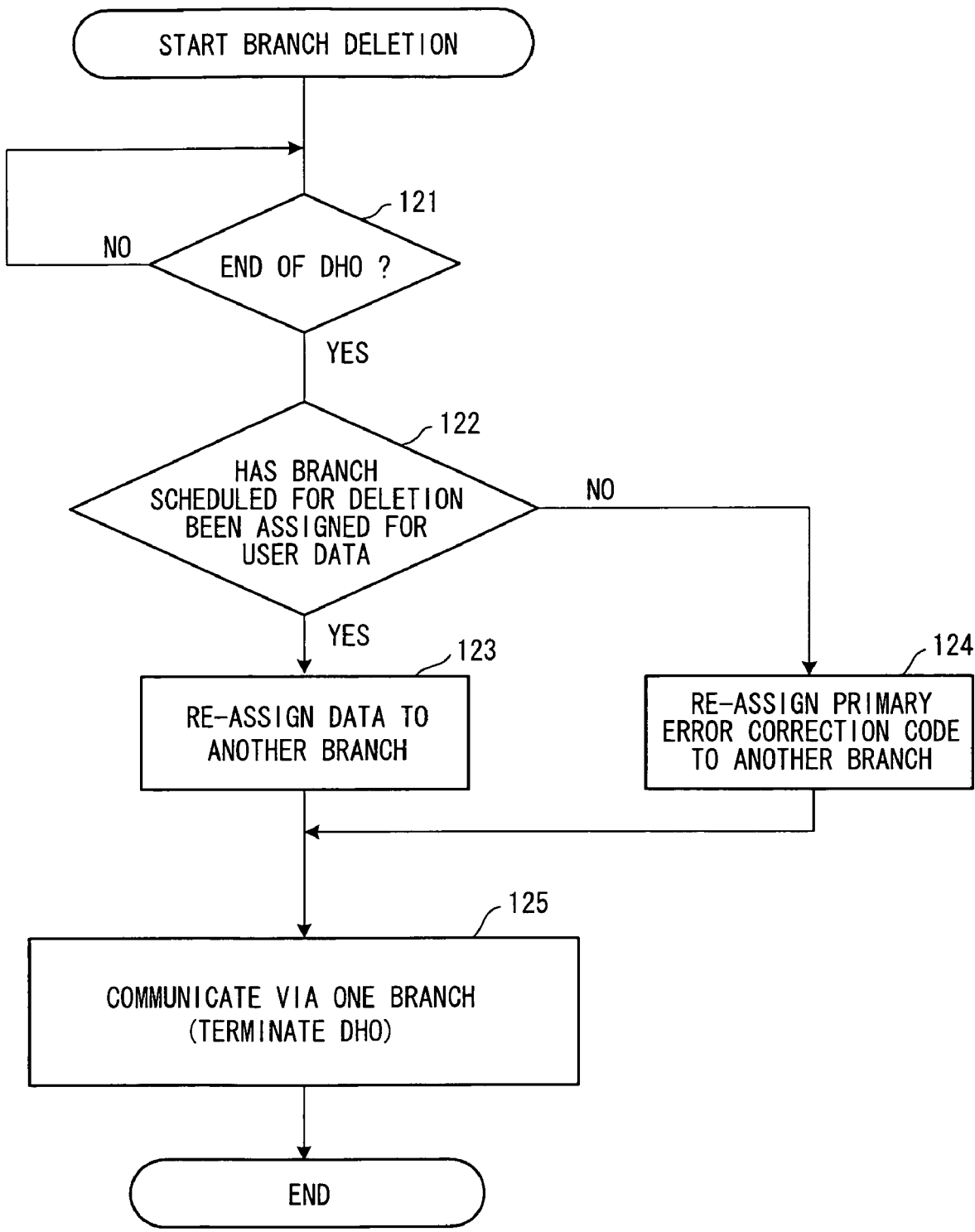
FIG. 17 is a processing flowchart for a case where the handover state is terminated and a certain branch is deleted.

FIG. 17 is a processing flowchart for a case where the handover state is terminated and a prescribed branch is deleted.

The transmission path selector/identification information add-on unit 62 checks to determine whether handover has ended (step 121). If handover has not ended, the processing at (B) of FIG. 16 is repeated. If handover has ended, then the transmission path selector/identification information add-on unit 62 checks to determine whether a branch scheduled for deletion has been assigned for the user data (step 122). If a branch scheduled for deletion has been assigned to the user data, then the user data is assigned to another branch (step 123). If a branch scheduled for deletion has not been assigned to the user data, then the primary error correction code is assigned to another branch (step 124). As a result, the mobile station 15 transmits the user data and the primary error correction code via one branch (step 125).

The method using the RSCP set forth above is capable of deciding the best transmission path in simple fashion in a case where the uplink and downlink frequencies are identical. However, a drawback is that in the case of a DS-CDMA FDD in which the uplink and downlink frequencies differ, the best transmission path cannot be decided accurately because the states of the transmission paths on the uplink and downlink differ. However, in accordance with a method of deciding the best uplink radio transmission path based upon the transmission power control (TPC) information from the base station, the best radio transmission path can be decided even in the case of DS-CDMA FDD. The principles of this decision method are as set forth below.

If the path is the best uplink radio transmission path, the number of times the base station instructs the mobile station to lower the transmission power by TPC bits is large in comparison with other transmission paths. Accordingly, the number of times transmission power is instructed to be lowered by the TPC bits is counted for every transmission path and the transmission path for which the count is high is decided upon as the best radio transmission path.

(b) Method of Deciding Best Downlink Radio Transmission Path of Base Station Controller, and Method of Changing Over Path The details of a method of deciding the best downlink radio transmission path in the base station controller will be described in simple terms. The mobile station 15 (FIG. 1) transmits TPC-bit information to the base stations 13a, 13b on the DPCCH based upon the reception quality of the downlink transmission path.

Over the TTI (Transmission Time Interval), each of the base stations 13a, 13b counts the number of times transmission power is instructed to be lowered by the TPC-bit information and transmits the count to the base station controller 11. The latter receives this number of times in the TTI and determines which transmission path is the best based upon the number of times transmission power is instructed to be lowered. On the basis of the result of this determination, the base station controller 11 decides to which branch the user data or the error correction data is to be assigned. As a result, it is possible to ascertain the best transmission path in real time.

Figure 18:
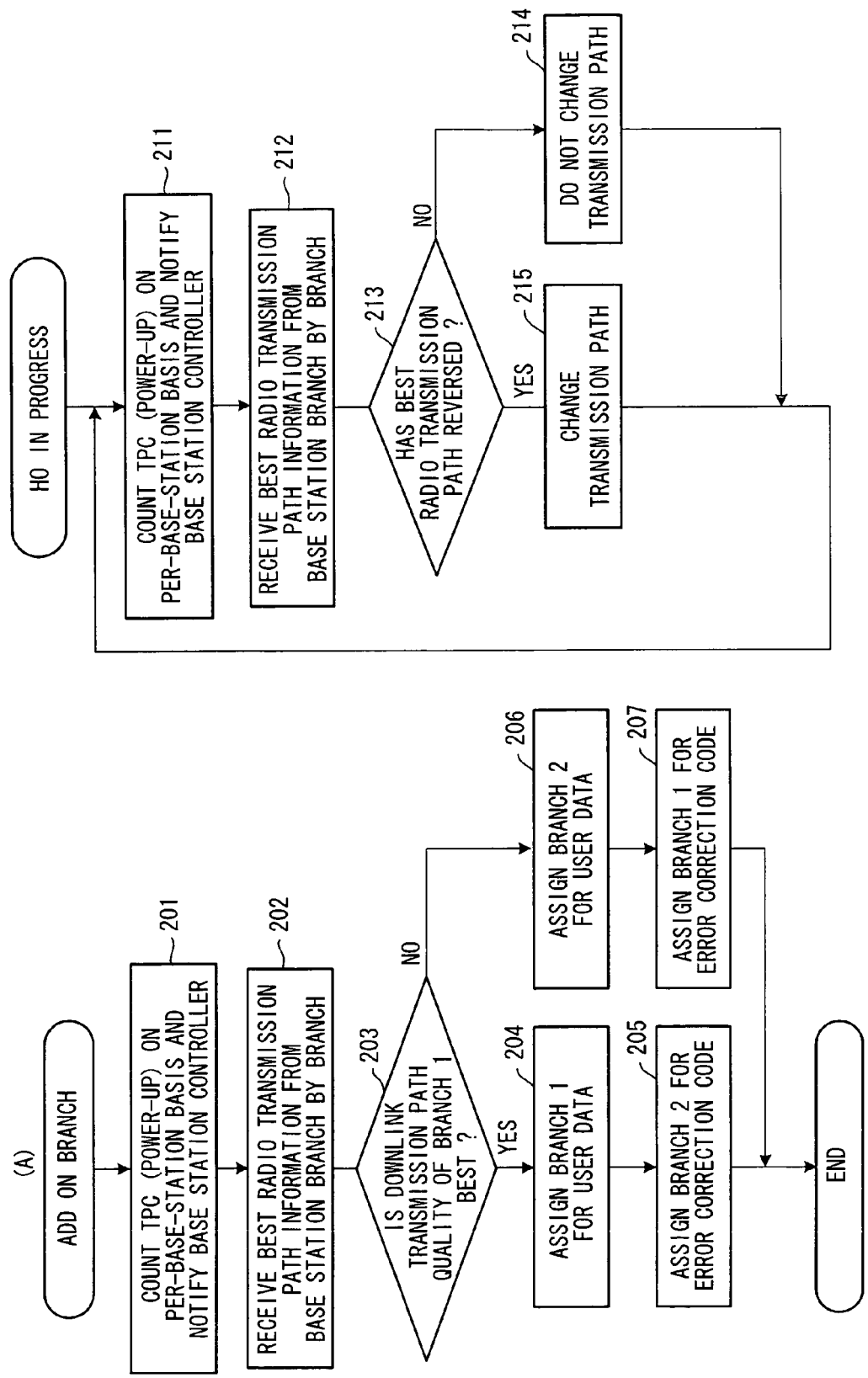
FIG. 18 illustrates a flowchart of a decision method for deciding the best downlink radio transmission path at a base station controller using transmission power control information (TPC information), and a flowchart of a path changeover method.

FIG. 18 illustrates a flowchart of a decision method for deciding the best downlink radio transmission path at the base station controller 11 using transmission power control information (TPC information), and a flowchart of a path changeover method. For the hardware configuration, refer to FIG. 1. Although the processing in the base station controller 11 will be described, the best radio transmission path can be decided and changed over by similar processing at each node.

If the handover state is attained and a new branch (transmission path) is added on [(A) of FIG. 18], each of the base stations 13a, 13b count, over the period of the TTI, the number of times transmission power is instructed to be lowered in TPC bits from the mobile station 15 and report the count values to the base station controller 11 (step 201). The base station controller 11 receives from the base stations 13a, 13b the number of times lowering of transmission power is instructed on each of the transmission paths (each of the branches) (step 202) and checks to determine whether the downlink transmission path quality of a first branch is the best (step 203).

If the downlink transmission path quality of the first branch is the best, the base station controller 11 assigns the first branch for the user data (step 204) and assigns the second branch for the primary error correction code (step 205). The base station controller 11 sends the user data and primary error correction code to the first and second branches based upon these assignments.

On the other hand, if the downlink transmission path quality of the first branch is not the best but the downlink transmission path quality of the second branch is, then the base station controller 11 assigns the second branch for the user data (step 206) and assigns the first branch for the primary error correction code (step 207). The base station controller 11 sends the user data and primary error correction code to the first and second branches based upon these assignments.

The processing shown at (B) of FIG. 18 thenceforth continues in the handover state. That is, each of the base stations 13a, 13b count, over the period of the TTI, the number of times transmission power is instructed to be lowered in TPC bits from the mobile station and report the count values to the base station controller 11 (step 211). The base station controller 11 receives from the base stations 13a, 13b the number of times lowering of transmission power is instructed on each of the transmission paths (each of the branches) (step 212) and checks to determine whether the best downlink transmission path has reversed based upon the number of times lowering of transmission power has been instructed (step 213). If there has not been a reversal, then the base station controller 11 maintains and does not change the thus-far assigned transmission paths of the user data and primary error correction code (step 214). If there has been a reversal, on the other hand, then the base station controller 11 changes over the transmission paths assigned for the user data and primary error correction code (step 215) and selectively outputs the user data DT and primary error correction code ECC to respective ones of the transmission paths.

Figure 19:
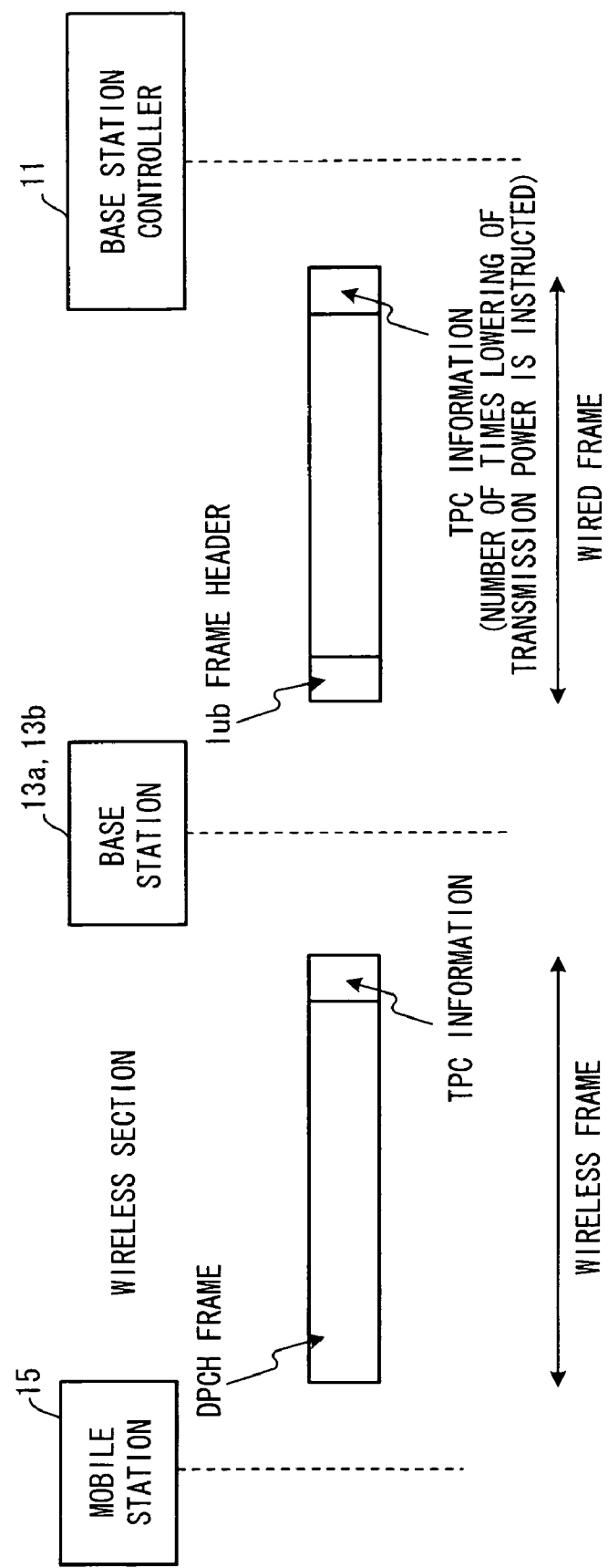
FIG. 19 is a diagram useful in describing a method of transmitting TPC information between a mobile station and a base station and a method of transmitting TPC information between a base station and a base station controller.
Figure 36:
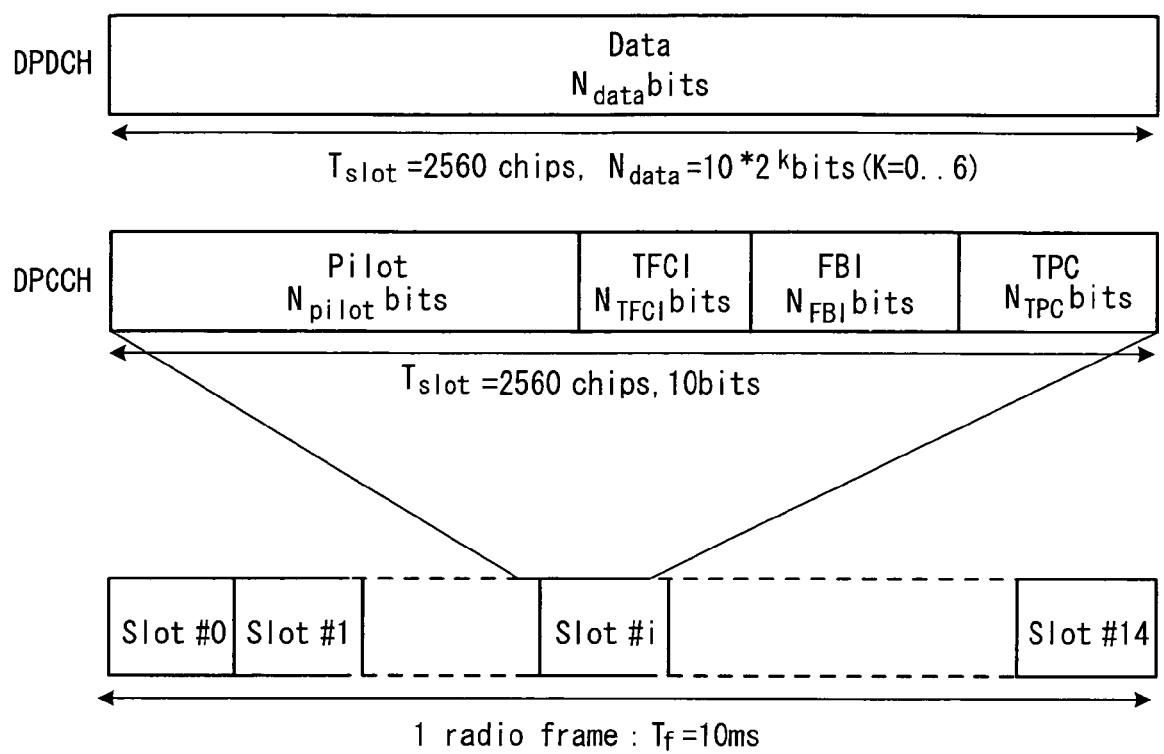
FIG. 36 is a diagram useful in describing an uplink DPCCH channel
Figure 37:
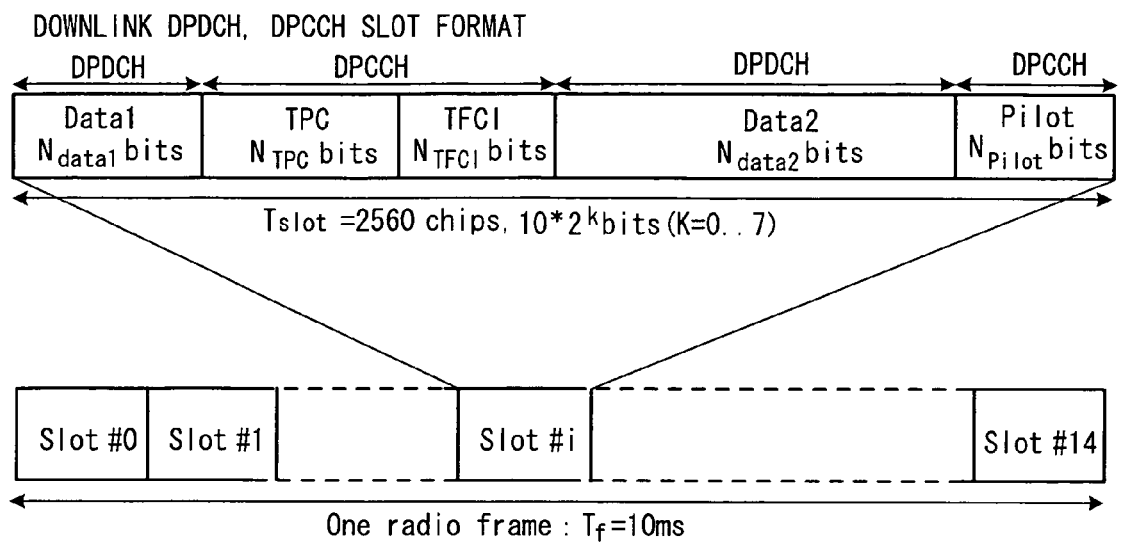
FIG. 37 is a diagram useful in describing a downlink DPCCH channel
Figure 38:
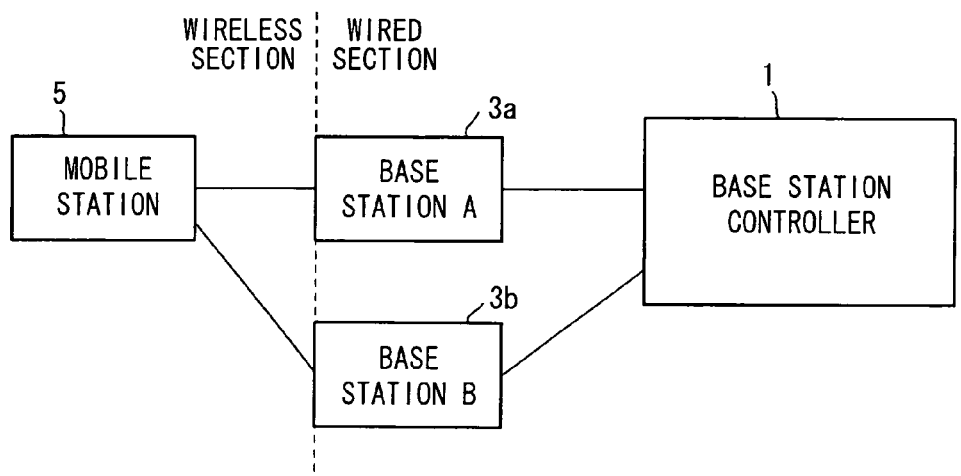
FIG. 38 is a diagram useful in describing a transmission path at the time of handover due to travel.
Figure 39:
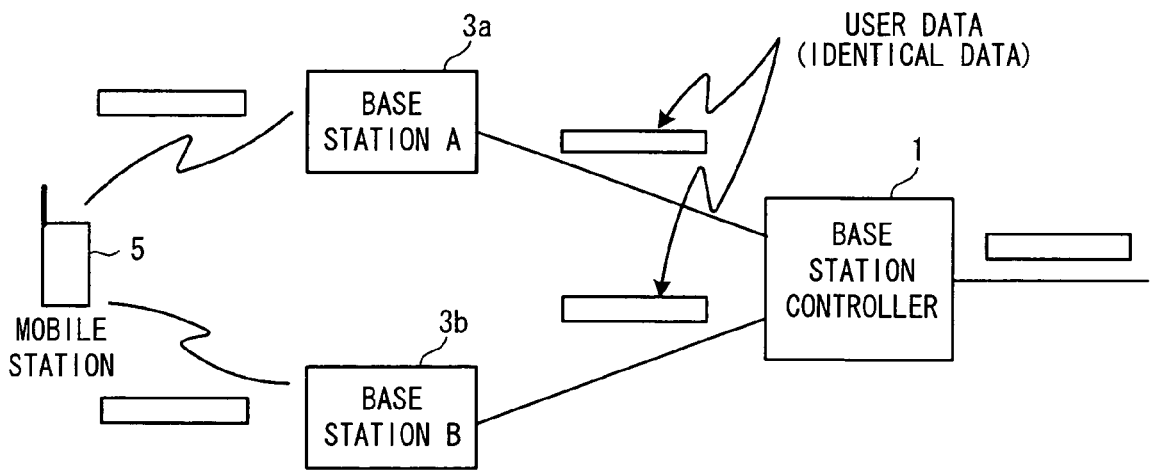
FIG. 39 is a diagram useful in describing handover control in the DHO state.
Figure 40:
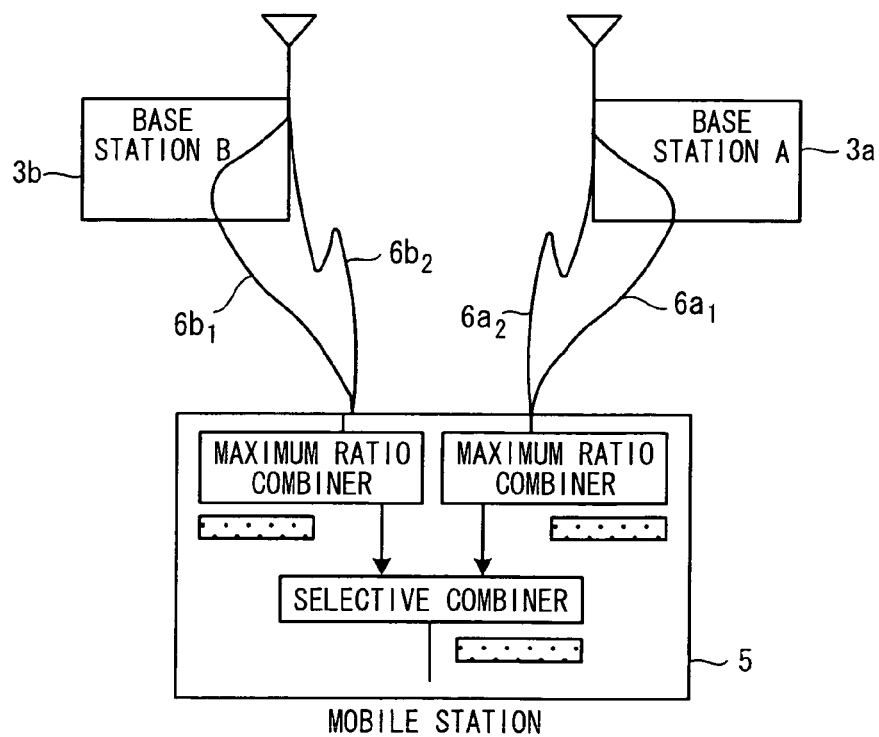
FIG. 40 is a diagram useful in describing other handover control in the DHO state.
Figure 41:
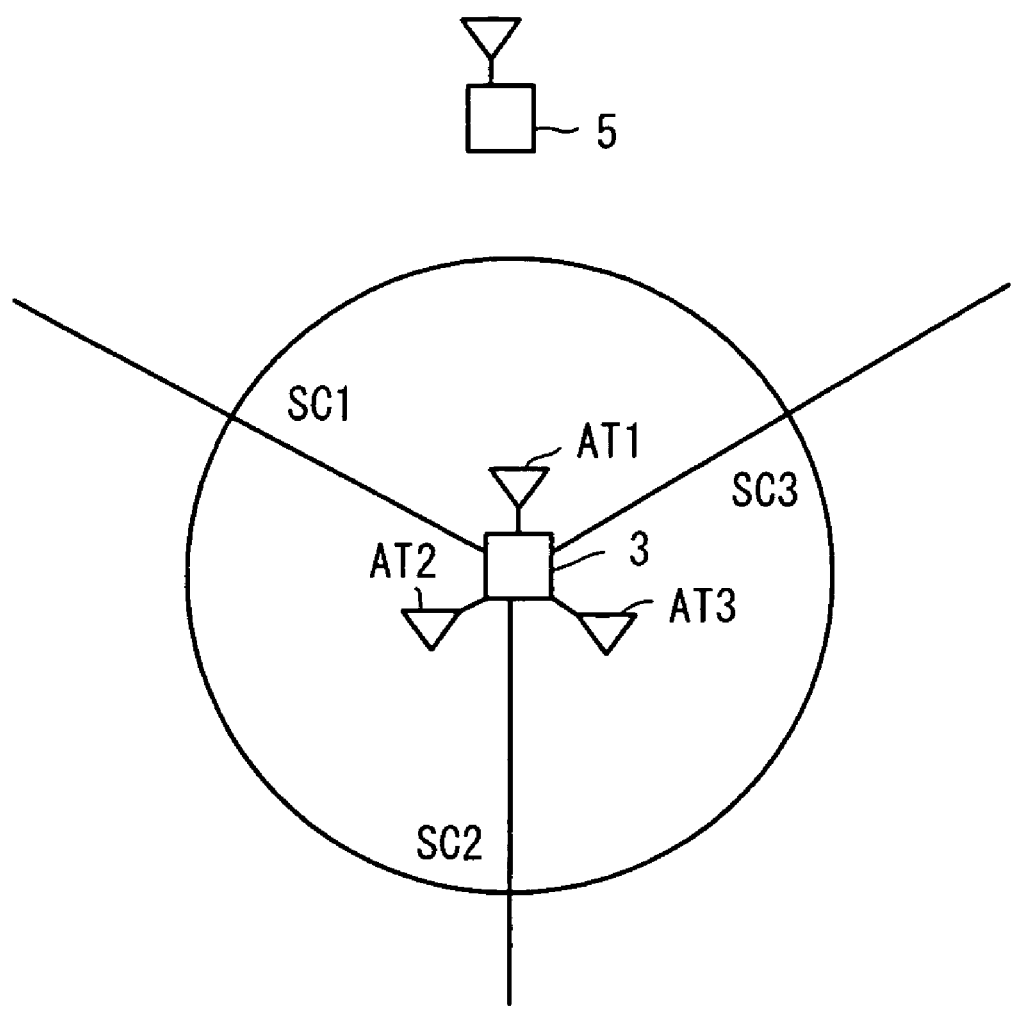
FIG. 41 is a diagram useful in describing sector handover (SHO) control.

FIG. 19 is a diagram useful in describing an example of transmission of TPC information from a mobile station to a base station and an example of transmission of TPC information from a base station to a base station controller. TPC information (transmission-power down/up command) is sent from the mobile station 15 to the base stations 13a, 13b using the TPC bits of the DPCCH channel (FIG. 36), and TPC information (number of times lowering of transmission power is instructed) is sent from the base stations 13a, 13b to the base station controller 11 upon being inserted into a TPC information field of the Iub uplink frame.

(H) Target Quality of Each Transmission Path

Figure 20:
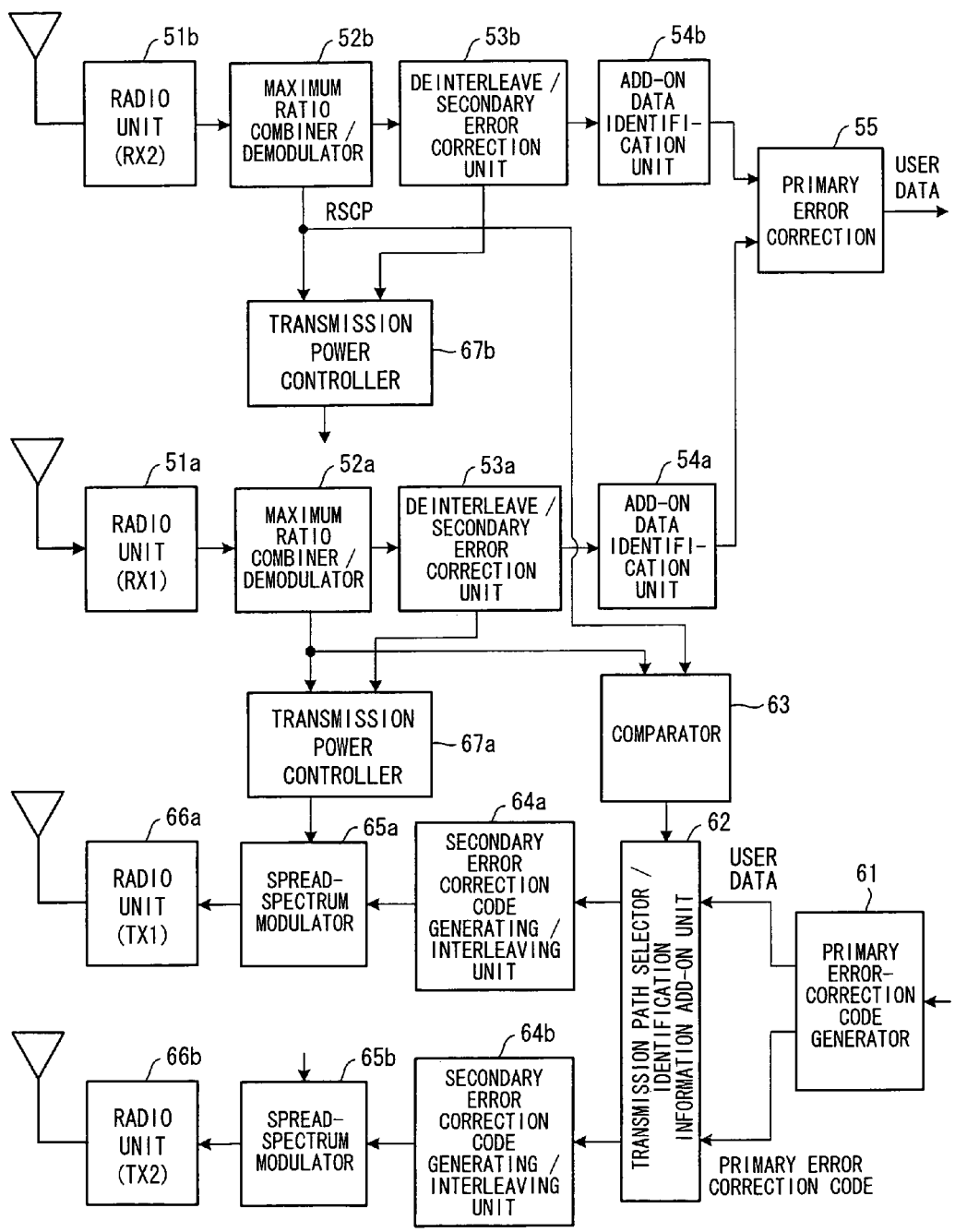
FIG. 20 is a block diagram of a mobile station having transmission power controllers.

FIG. 20 is a block diagram of a mobile station having a transmission power controller. This arrangement is obtained by adding on transmission power controllers 67a, 67b to the arrangement of FIG. 8. The transmission power controllers 67a, 67b each compare reception quality with target quality and control the transmission power from the base station based upon whether quality is good or bad.

Figure 21:
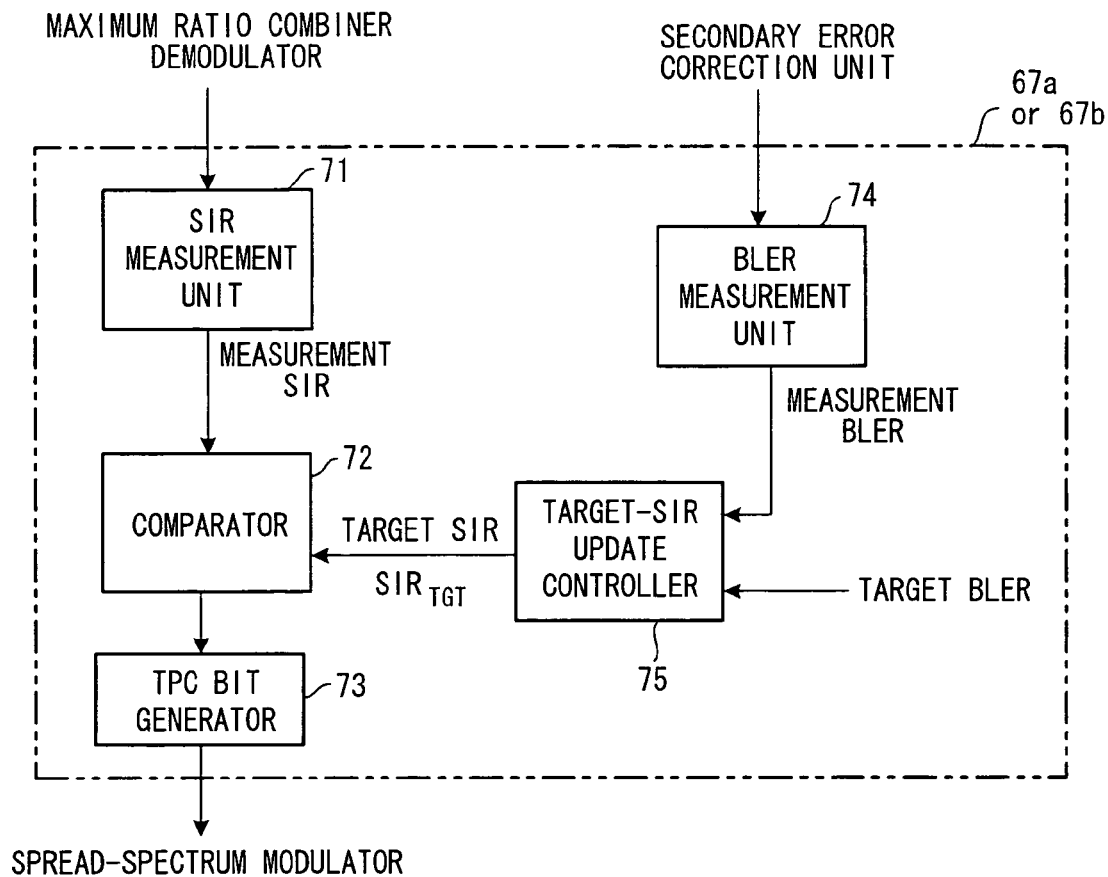
FIG. 21 is a block diagram of the transmission power controllers.

FIG. 21 is a block diagram of the transmission power controllers 67a, 67b. A SIR measurement unit 71 calculates the SIR value of the receive signal and outputs the value as measured SIR, and a comparator 72 compares the target SIR (=$SIR_{TGT}$) with the measured SIR. If the measured SIR is larger than the target SIR, a TPC bit generator 73 creates a command that lowers the transmission power by TPC bits. If the measured SIR is smaller than the target SIR, then the TPC bit generator 73 creates a command that raises the transmission power by the TPC bits. A BLER measurement unit 74 subjects the result of decoding in secondary error correction processing to CRC error detection on a per-transport-block basis, measures error rate (measured BLER=number of erroneous blocks/total number of blocks) in a prescribed T and input the error rate to a target-SIR update controller 75. The latter compares the required BLER and measured BLER and increases or decreases the target SIR based upon the size comparison. That is, the target-SIR update controller 75 exercises control to increase the target SIR a prescribed amount if the measured BLER is inferior to the target BLER and to decrease the target SIR a prescribed amount if the measured BLER is superior.

If the user data and primary error correction code are transmitted via separate branches (transmission paths) in accordance with the first to third embodiments in the arrangement having the transmission power control function described above, the required target quality can be obtained overall even if the target quality of each branch is inferior to the required target quality.

Assume that one required target quality $SIR_{TGT}$ is being requested for the user data at the present time. Accordingly, in a case where the first to third embodiments are applied, the target quality of the result (user data) obtained by correcting the user data by primary error correction code is the target quality $SIR_{TGT}$.

Accordingly, the target quality of the user data before the primary error correction and the target quality of the primary error correction code are set separately and it will suffice if the user data after the primary error correction satisfies the target quality $SIR_{TGT}$. This means that the target qualities applied to the user data before the primary error correction and to the primary error correction code can be set lower than the target quality $SIR_{TGT}$ applied to the user data after the primary error correction. The reason for this is that if the target quality before the primary error correction is the same as the target quality $SIR_{TGT}$ of the user data after the primary error correction, the result will be excessive quality.

The same can be said to hold similarly with regard to the target quality of the primary error correction code. It is possible to set the target quality lower by generating a primary error correction code that exceeds the error correction ability to the extent that the target quality $SIR_{TGT}$ of the user data after the primary error correction is obtained.

Figure 22:
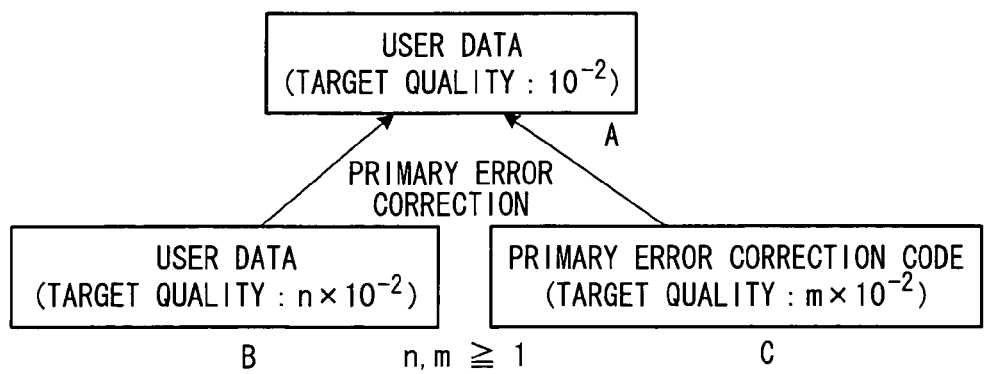
FIG. 22 is a diagram useful in describing target qualities of primary error correction code and user data.

By way of example, as shown in FIG. 22, the following equation holds:

$$A = B - (1-C) \times D$$

where the following holds:

① target quality $SIR_{TGT}$ (BER) of user data after the primary error correction: A ($=1 \times 10^{-2}$)

② target quality (BER) of user data before the primary error correction: B ($=10 \times 10^{-2}$)

③ target quality (BLER) of primary error correction code: C ($=m \times 10^{-2}$)

④ error correction ability of primary error correction code: D ($=1 \times 10^{-1}$)

Figure 23:
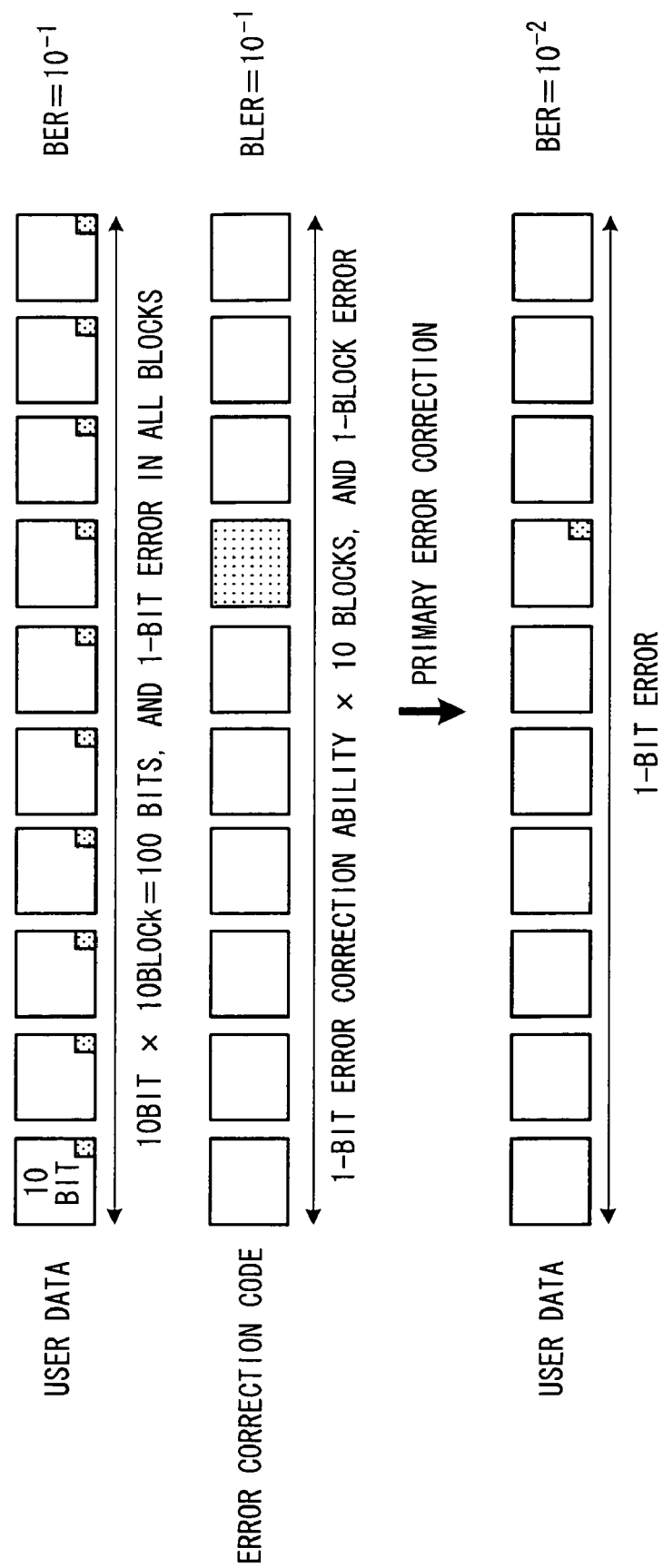
FIG. 23 is an explanatory view illustrating the fact that a required target quality $SIR_{TGT}$ can be satisfied even if individual target qualities of primary error correction code and user data are poor.

Substituting the numerical values into this equation gives us $$10 \times 10^{-2} - (1 - 10 \times 10^{-2}) \times 10^{1} = 1 \times 10^{-2}$$

and the required target quality $SIR_{TGT}$ is satisfied even if each of the target qualities is poor. FIG. 23 is a diagram useful in describing the example cited above. It will be understood that user data having a BER of $10^{-2}$ is obtained after the primary error correction even if the BER of the user data is $10^{-1}$ and the BER of the primary error correction code is $10^{-1}$.

(I) Fourth Embodiment

A fourth embodiment is a method of varying error correction code. Primary error correction ability on the transmitting side is controlled in accordance with whether or not user data can be received correctly. In overview, the fourth embodiment is such that data is received on the data receiving side, a primary error correction code generator on the transmitting side is notified of information as to whether user data could be received correctly by error correction, and the primary error correction code generator controls the primary error correction ability based upon the state of reception on the receiving side.

Figure 24:
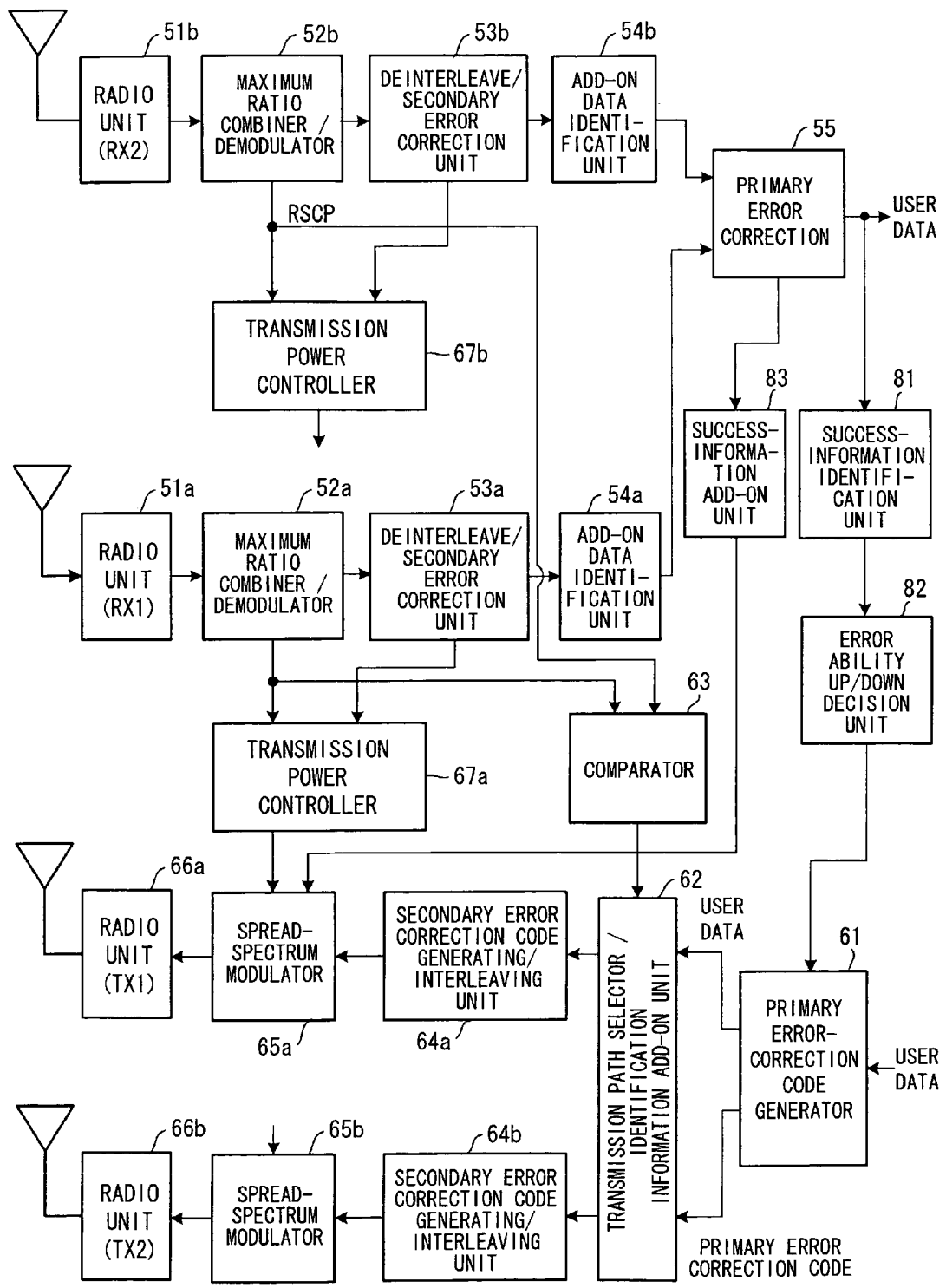
FIG. 24 is a block diagram of a mobile station for implementing a fourth embodiment.

FIG. 24 is a block diagram of a mobile station for implementing the fourth embodiment. Components identical with those of the arrangement of FIG. 20 are designated by like reference characters. This embodiment differs in that it is equipped with a success-information identification unit 81, error ability up/down decision unit 82 and success-information add-on unit 83.

Figure 25:
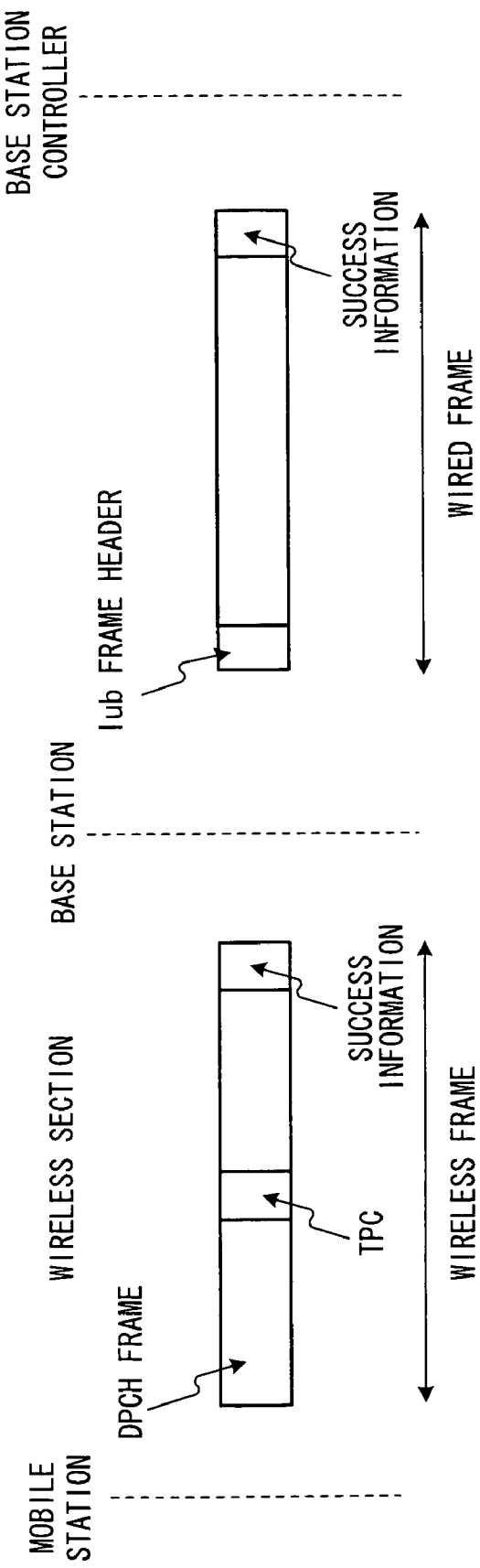
FIG. 25 is a diagram useful in describing a frame that gives notification of success information.

The base stations 13a, 13b or base station controller 11 apply error correction processing to user data received from the mobile station 15 and report success information to the mobile station 15 if the user data can be restored correctly. FIG. 25 is a diagram useful in describing a success-information notification frame. A prescribed field of a DPCCH channel is assigned as a success information field between the mobile station 15 and base stations 13a, 13b, and success information (0: success; 1: failure) is transmitted upon being placed in this field. A prescribed field of an Iub frame is assigned as a success information field between the base stations 13a, 13b and base station controller 11, and success information (0: success; 1: failure) is transmitted upon being placed in this field.

The success-information identification unit 81 identifies the success information sent from the base stations or base station controller and inputs the information to the error ability up/down decision unit 82. The latter counts the number of items of success information in a prescribed measurement interval, calculates the success rate, instructs the primary error correction code generator 61 to lower the primary error correction ability if the success rate is greater than a threshold value and instructs the primary error correction code generator 61 to raise the primary error correction ability if the success rate is less than the threshold value. The primary error correction code generator 61 controls the primary error correction ability based upon the instruction. It should be noted that the threshold value is defined by the reception target quality on the receiving side.

Figure 26:
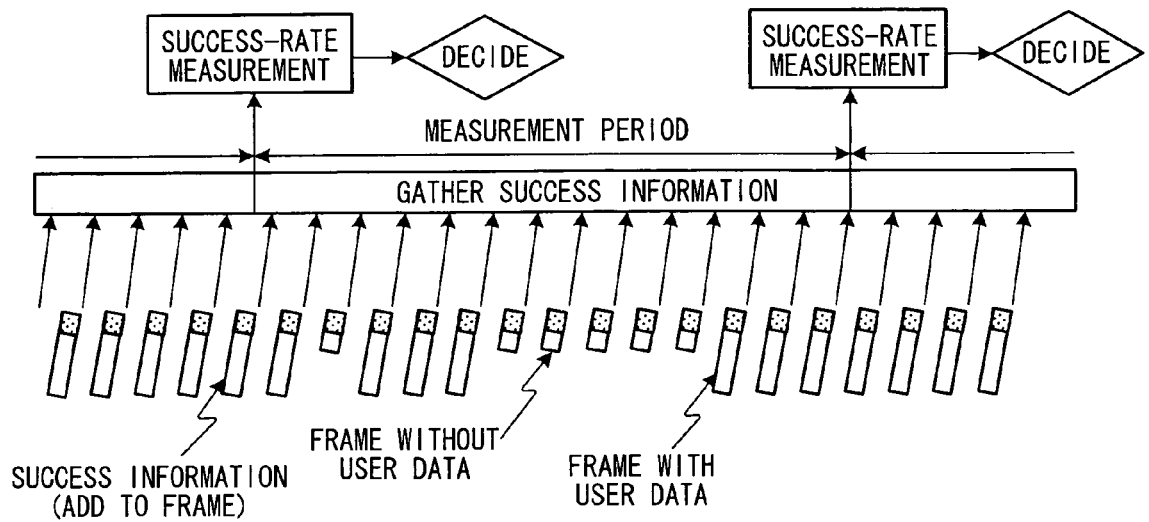
FIG. 26 is a diagram useful in describing variable control of error correction ability.

FIG. 26 is a diagram useful in describing variable control of error correction ability. This illustrates the manner in which primary error correction ability is controlled based upon the number of items of success information in the measurement interval.

Figure 27:
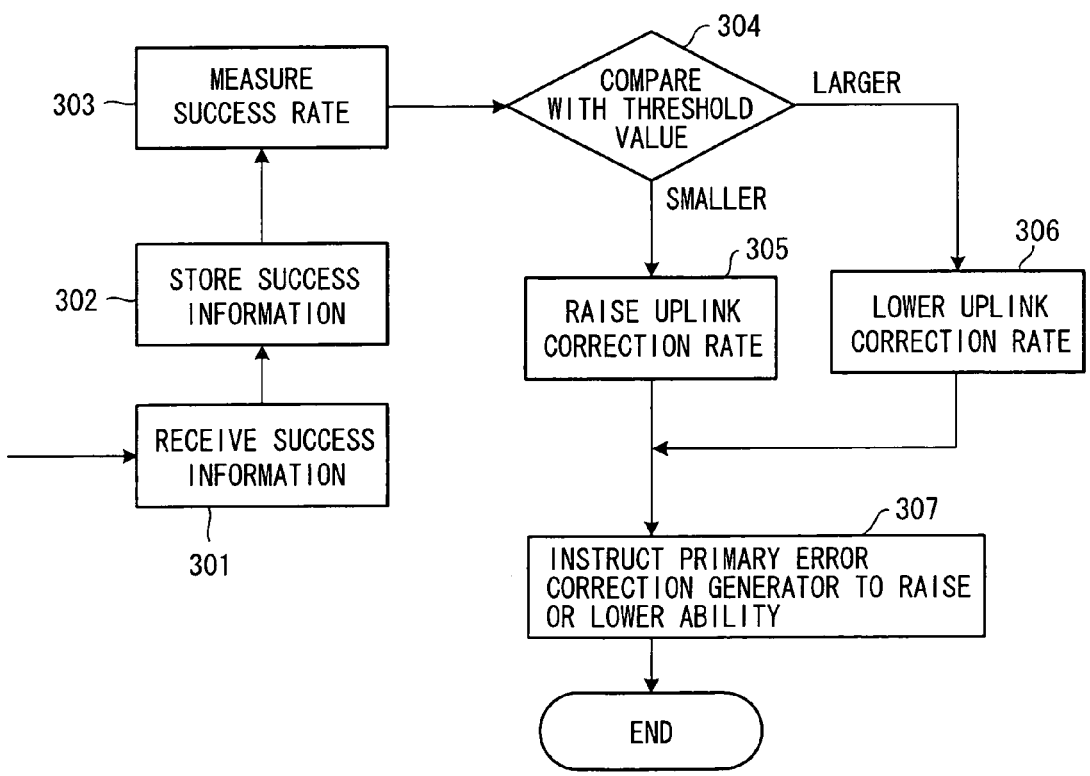
FIG. 27 is a flowchart of control of primary error correction ability of a mobile station.

FIG. 27 is a flowchart of control of primary error correction ability of a mobile station. Success information is received (step 301), the success information is stored and the success rate in the prescribed measurement interval is calculated (steps 302, 303). The success rate is compared with the threshold value (step 304). If the success rate is less than the threshold value, it is decided to raise the uplink primary error correction ability (step 305). If the success rate is greater than the threshold value, it is decided to lower the uplink primary error correction ability (step 306). The up/down command is issued to the primary error correction code generator 61, which proceeds to control the primary error correction ability (step 307).

First Modification

Figure 28:
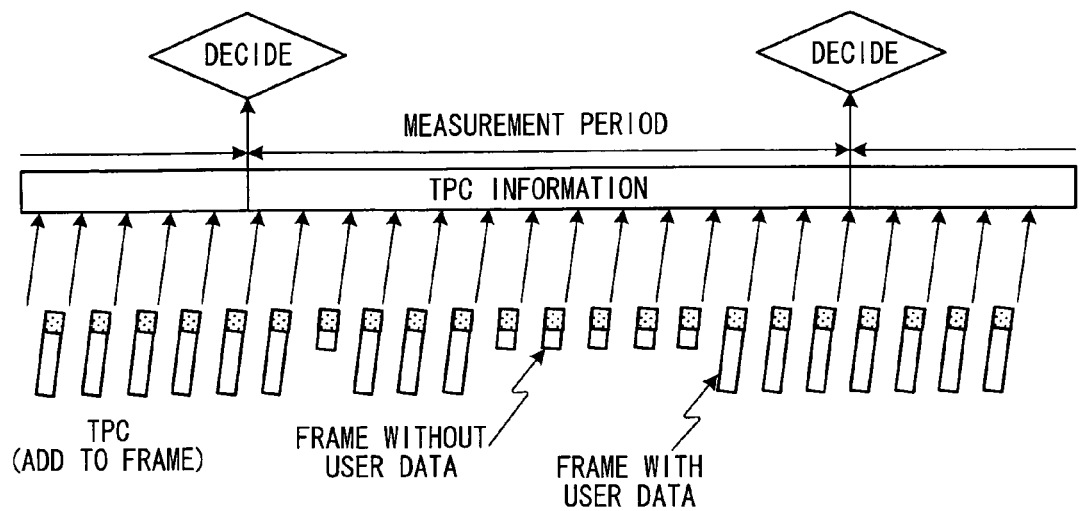
FIG. 28 is an explanatory view in which error correction ability is controlled up or down using power control information (TPC information) from a base station in a wireless section.
Figure 29:
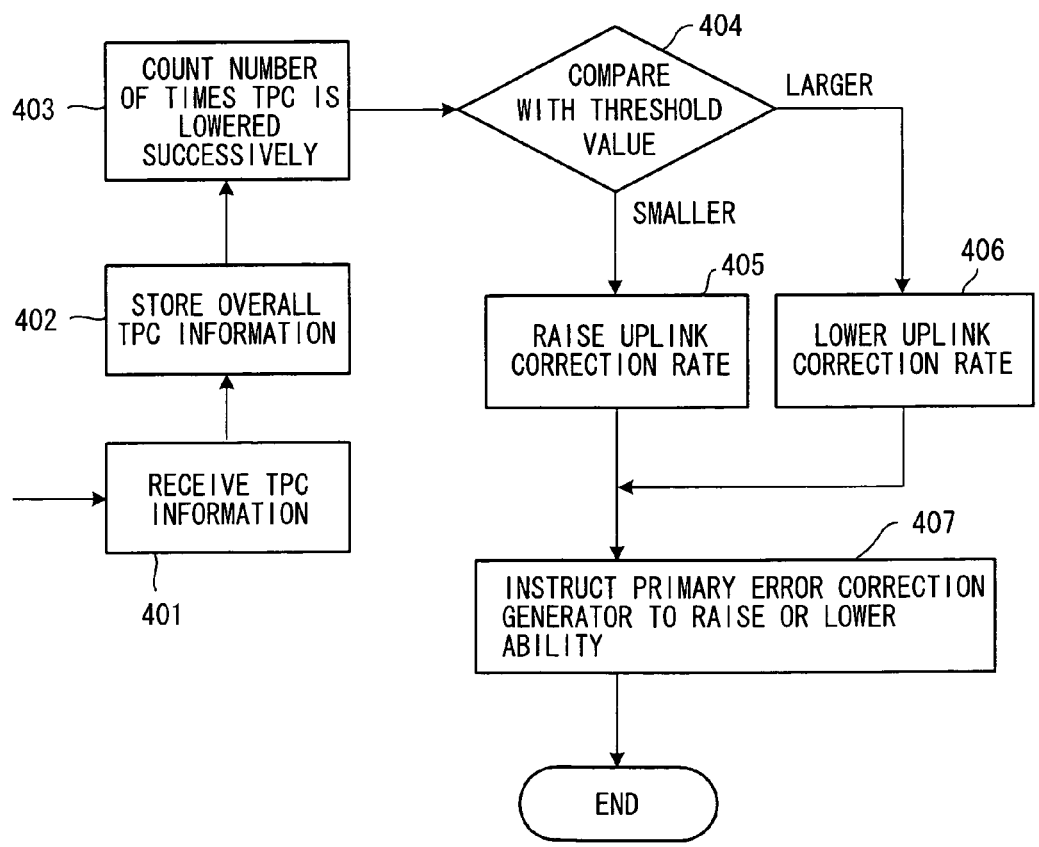
FIG. 29 is a flowchart for controlling error correction ability on the transmitting side using power control information (TPC information) from the receiving side.

The raising or lowering of error correction ability is controlled upon receiving the success information in the operation above. However, power control information (TPC information) from a base station in a wireless section can be used instead of the success information, as illustrated in FIG. 28. FIG. 29 is a flowchart for controlling error correction ability of the primary error correction code generator on the transmitting side using power control information (TPC information) from the receiving side.

TPC information is received from the base station (step 401), the TPC information is stored and the number of times lowering of power has been instructed is calculated in the prescribed measurement interval (steps 402, 403). The number of times is compared with a threshold value (step 404). If the number of times is less than the threshold value, it is decided to raise the uplink primary error correction ability (step 405). If the number of times is greater than the threshold value, it is decided to lower the uplink primary error correction ability (step 406). The up/down command is issued to the primary error correction code generator 61, which proceeds to control the primary error correction ability (step 407).

Figure 30:
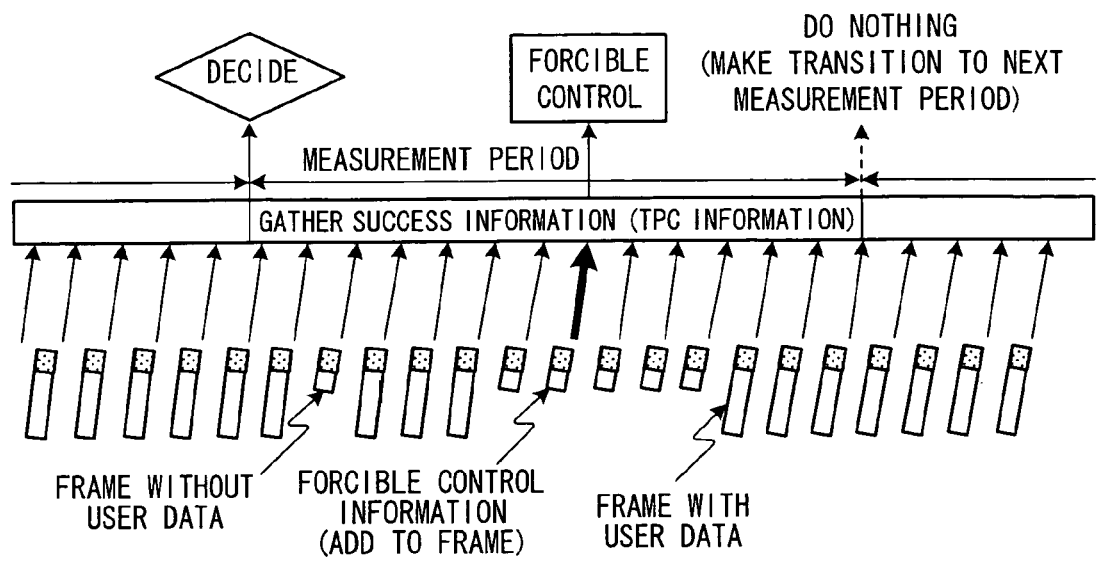
FIG. 30 is an explanatory view of a case where error correction ability is forcibly raised or lowered.

There are cases in control of error correction ability (FIGS. 27 and 29) in which the measured rate or the number of times lowering of power has been instructed exceeds the threshold value in the measurement interval during the time that the success rate or number of times is being measured on the receiving side. In such cases control can be exercised to forcibly raise or lower the error correction ability directly without waiting for expiration of the measurement interval and to make a transition to the next measurement interval without performing any operation when the present measurement interval expires, as illustrated in FIG. 30. If this arrangement is adopted, control of error correction ability can be speeded up.

Second Modification

Figure 31:
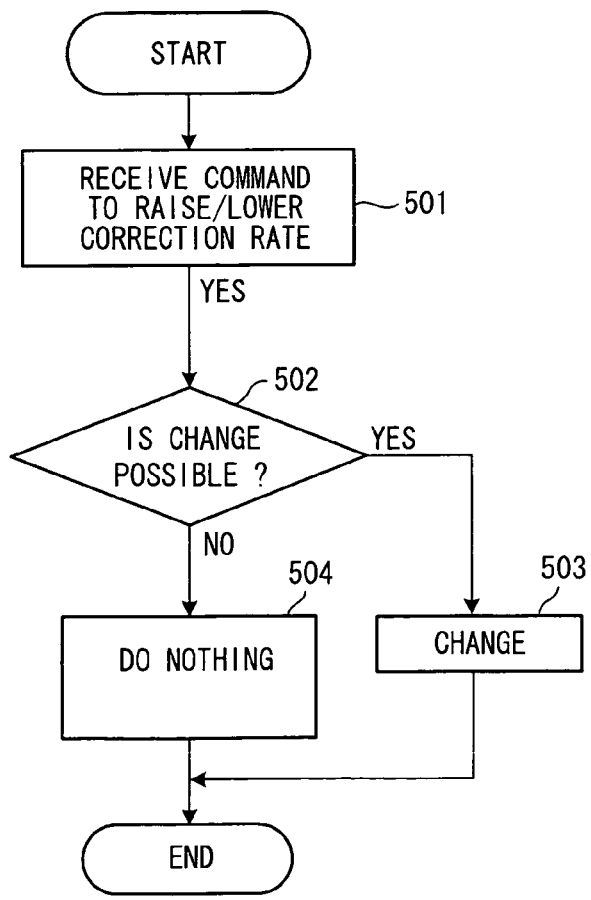
FIG. 31 is a flowchart of control of error correction ability.

The primary error correction code generator 61 is capable of exercising control so as to raise or lower error correction ability beyond a set range. FIG. 31 is a flowchart of such control of error correction ability. If a down command for lowering the primary error correction ability is issued from the error ability up/down decision unit 82 (step 501), the primary error correction code generator 61 checks to determine whether the error correction ability can be lowered (step 502). If the error correction ability can be lowered, then the primary error correction ability is lowered (step 503). If the error correction ability cannot be lowered, then the primary error correction ability is not changed or transmission of the primary error correction code is halted (step 504). Similarly, when an up command for raising the primary error correction ability is issued, the primary error correction code generator 61 does not change the primary error correction ability if it is not possible to raise the error correction ability any further, and raises the primary error correction ability if this is possible.

Third Modification

The foregoing is for a case where success information is transmitted from the receiving side (e.g., a base station) to the transmitting side frame by frame. However, it can also be so arranged that statistical processing is executed on the receiving side (base station) based upon reception success/failure or reception power control information (TPC information) or reception quality, and the up/down command for error correction ability is reported to the transmitting side (mobile station). In accordance with such an arrangement, when the up/down command for error correction ability is received, the primary error correction code generator on the transmitting side is capable of immediately exercising control to raise or lower the error correction ability based upon this information.

Figure 32:
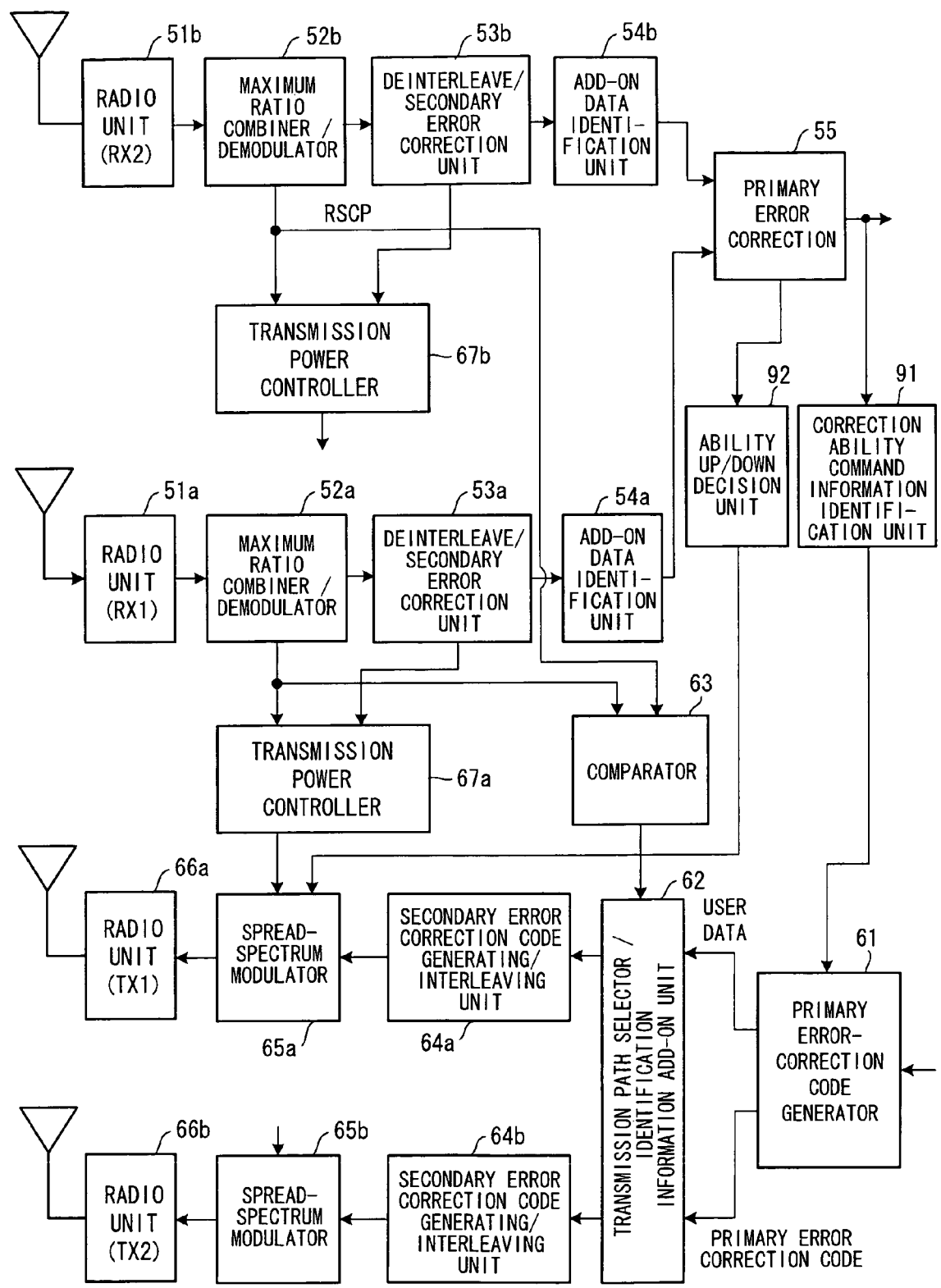
FIG. 32 is a block diagram of a mobile station that controls error correction ability up or down in a third modification.

FIG. 32 is a block diagram of a mobile station that controls error correction ability up or down in a third modification. Components identical with those of FIG. 20 are designated by like reference characters. This modification differs in that it is equipped with a correction ability command information identification unit 91 for identifying error correction ability up/down command information reported from a base station or base station controller, and an ability up/down decision unit 92 for measuring, over a prescribed interval, success rate indicating whether correct user data could be restored after the primary error correction, and deciding whether to raise or lower the error correction ability in the base station or base station controller based upon the success rate. An ability command field is provided instead of the success information field of FIG. 25 and up/down command information is inserted into this field.

Figure 33:
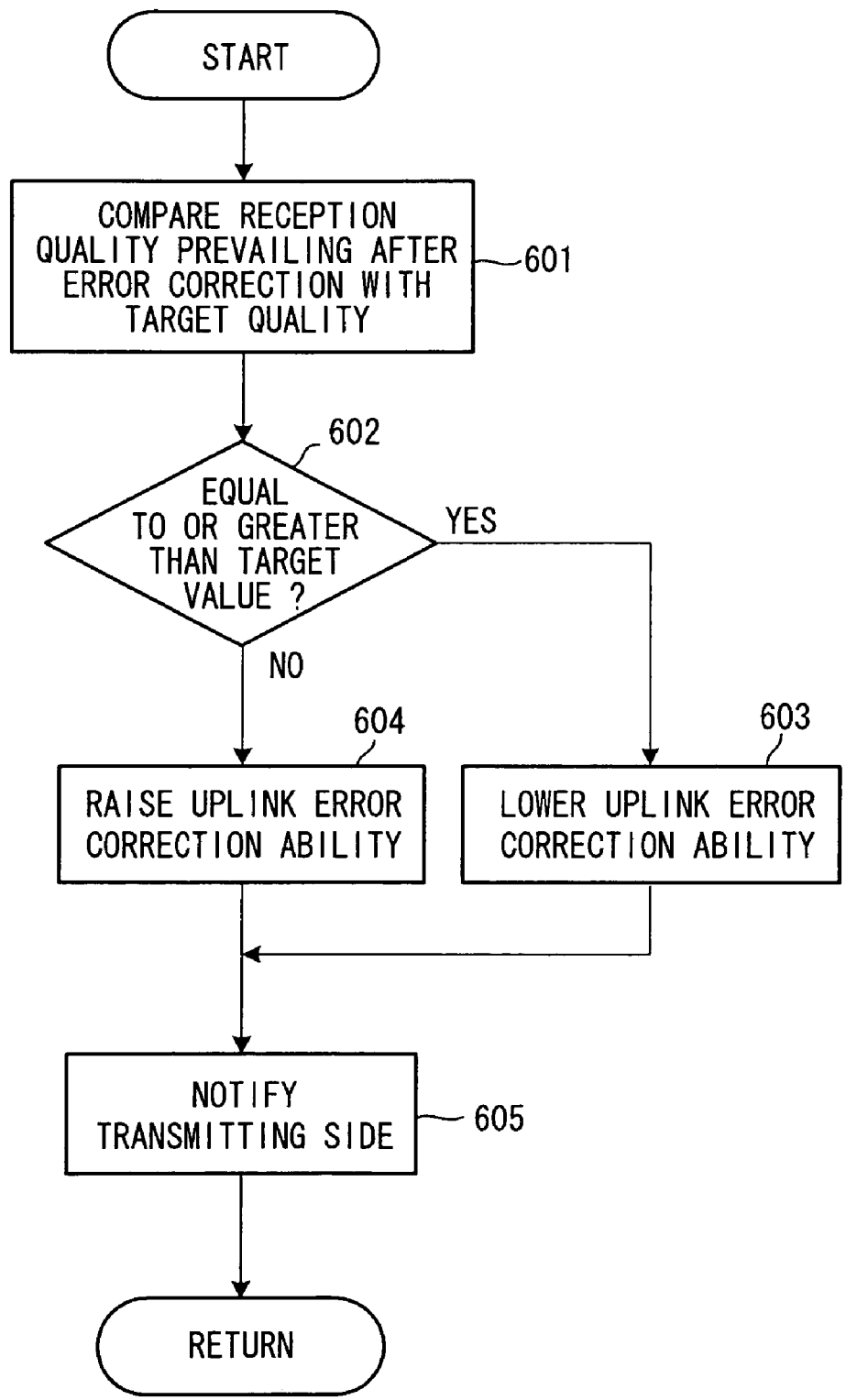
FIG. 33 is a flowchart of processing for deciding to raise or lower error correction ability and so instruct the transmitting side based upon reception quality on the receiving side.
Figure 34:
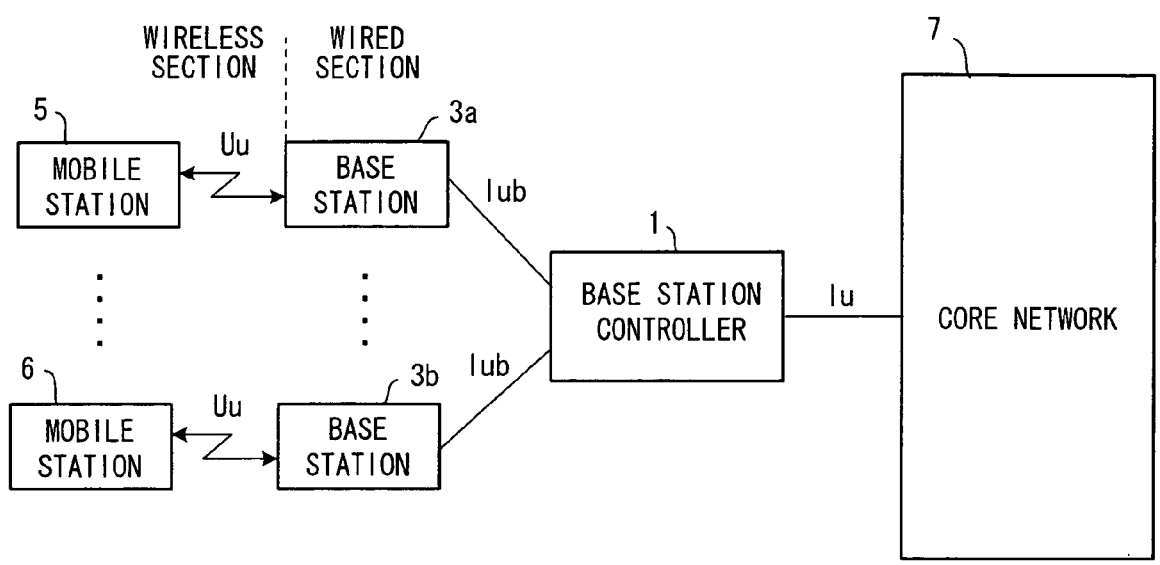
FIG. 34 is a schematic view of a wireless communication system.
Figure 35:
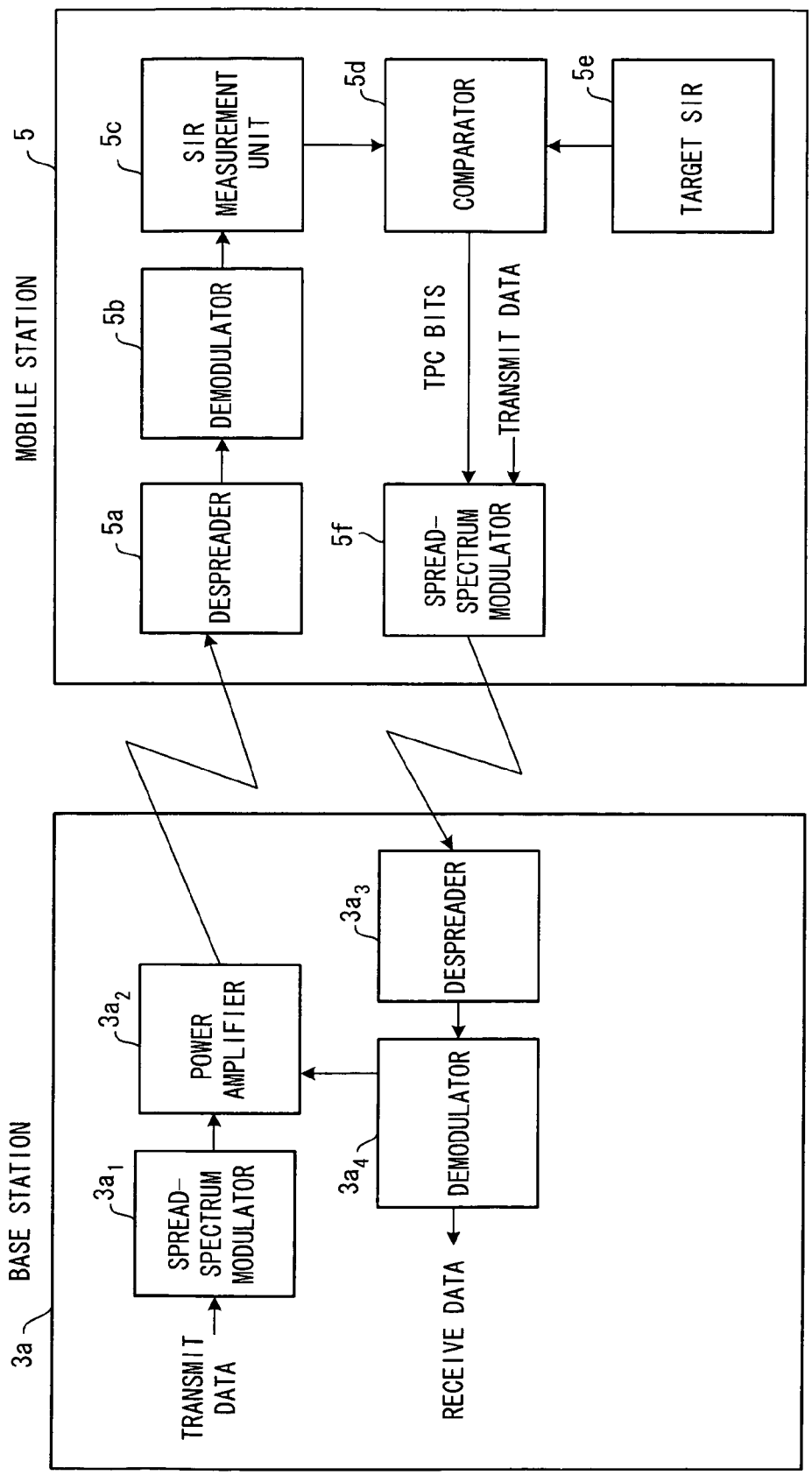
FIG. 35 is a block diagram for describing transmission power control (inner-loop power control)

FIG. 33 is a flowchart of processing for deciding to raise or lower error correction ability and so instruct the transmitting-side (mobile station) based upon reception quality on the receiving side (e.g., at the base station controller).

The receiving side compares reception quality after error correction with target quality (steps 601, 602), decides to lower the uplink error correction ability if the reception quality is equal to or greater than the target quality (sep 603), decides to raise the uplink error correction ability if the reception quality is less than the target quality (step 604), and instructs the mobile station to raise or lower the error correction ability (step 605).

Method of Reporting Power Control Information to Error Correction Code Generator The sending and receiving of power control information (TPC information) between a base station and base station controller is carried out by mapping the TPC information to a suitable location of an Iub frame, as illustrated in FIG. 19. Further, the power control information (TPC) information is placed on the CPCCH channel between the mobile station and base station. Since the TPC information is appended to the uplink DPCCH and transmitted even in a case where downlink user data is not transmitted from the base station, the power control information can be received at all times on the side of the base station.

The transmission of power control information from the base station the base station controller is implemented by having the base station map the power control information in the wireless frame to an Iub frame (wired frame). In the case of a 3GPP system, the uplink transmission period of the Iub frame is an interleave period in the wireless frame. The base station statistically processes the receive TPC in this interleave period and maps it to the Iub frame.

For example, if the number of TPC items received by the base station in one wireless frame is plural and all of these commands are not the same (power-increase command: power-decrease command=m:n), this number or that having the greater commands is mapped to the Iub frame. In a case where the number is reported, the Iub frame is provided with power-increase command/power-decrease command fields and the number existing is placed in each of these fields. Further, in a case where the larger one is reported, one bit worth of a power control command information field is prepared and the power-increase command/power-decrease command (1: power-increase command; 0: power-decrease command) is reported to the base station controller.

The foregoing is a case where two transmission paths are provided and user data and primary error correction code are transmitted on respective ones of the transmission paths. However, three or more transmission paths can be provided and it can be so arranged that user data or primary error correction code is transmitted on a plurality of transmission paths.

Further, the embodiment has been described with regard to a case where primary error correction code and secondary error correction code are appended and corrected. However, the present invention can be applied as a matter of course even in a case where only primary error correction code is appended.

(J) Modifications

First Modification

In the foregoing embodiments, the transmit timings of the user data DT and primary error correction code ECC are not described in detail. However, it is desirable that control of the timing of ECC transmission be performed by the base station in such a manner that the ECC can be received completely by the mobile station until the mobile station receives the DT corresponding to the ECC completely, or within a prescribed period of time following completion of reception. The reason for this is that the start of decoding is delayed owing to a delay in reception of the ECC.

It is desirable in all of the embodiments that if it is determined that reception of ECC will not be obtained, then DT is output as the received DT in an ensuing block without ECC and without performing an error correction using this ECC. The reason for this is that although reception of DT may involve an error, production of voice or the like will be possible. On the other hand, in a case where ECC is not obtained, it is also desirable that discarding (inclusive of not outputting voice of the like) or re-transmission of DT also be requested. The reason for this is that if reliability is low and data is packet data or like, some-degree of delay is allowed.

Second Modification

When one path that performs ECC transmission is set with respect to one path that performs transmission of the user data DT, radio transmission resources may come under pressure.

Accordingly, in a case where different data sequences DT1, DT2 are transmitted via first and second paths, it is desirable that ECC1 regarding DT1 and ECC2 regarding DT2 be multiplexed and transmitted on a third path.

For example, if the transmission speed of DT1 is S1 and the transmission speed of DT2 is S2, then ECC1 and ECC2 are concatenated and transmitted as a new data sequence ECC+ via the third path. At this time it is preferred that information indicative of a delimiter be inserted in such a manner that separation is possible at the mobile station.

Further, if the amount of data in ECC+ increases and transmission takes time, this will invite a delay in the decoding of DT1 and DT2. Accordingly, it will suffice to raise the transmission speed of ECC+ in accordance with the multiplex factor. If ECC+ can be transmitted by, e.g., code division, then raising the transmission speed is facilitated by lowering the SF, by way of example.

Third Embodiment

In a case where turbo code is used as error correction, a plurality of code sequences for error correction are generated with respect to original data U in the manner U, U', U'', etc.

At this time (1) the pair U and U' can be transmitted from a first base station (first path) to a mobile station and U'' can be transmitted from the second base station (second path), by way of example. (2) If transmission is possible from three or more base stations, it is a matter of course that the pair U and U' (or U'') is transmitted from the first base station (first path) to the mobile station and that U'' (or U') is transmitted from the second and third base stations (second and third buses). (3) Further, U can be transmitted from the first base station, U' from the second base station and U'' from the third base station.

In case of (1), when the second path in an instance where a signal from the second base station cannot be received by the mobile station is not reliable, if it is possible to receive U and U' from the first base station, then error correction decoding can be carried out using this pair. For example, it will suffice to execute SOVA or MAP processing.

Further, in case of (2), U'' (or U'') is transmitted with redundancy. As a result, the possibility that turbo decoding can be performed using the three items of information U, U', U'' rises and the error correction function manifests itself fully.

Furthermore, in case of (3), error correction can be performed if a signal from either one of the second and third base stations can be received in addition to the signal from the first base station. Moreover, if signals can be received from both, turbo decoding can be carried out using the three items of information U, U' and U'' and the error correction function manifests itself fully.

Effects of the Invention

With conventional schemes, the same data is issued to both in a multiple-branch state and waste results in terms of traffic. In accordance with the present invention, the amount of data in the primary error correction code can be made less than the amount of user data and it possible to reduce traffic.

There are many cases where the mobile station is at a location far from the base station at the time of handover, and it is assumed at this time that the transmission power value in the wireless section will be high in order to maintain quality. In accordance with the present invention, the spreading factor can be enlarged if the primary error correction rate is low, i.e., if the amount of data in the primary error correction code is small. This makes it possible to suppress the power value.

In accordance with the present invention, it is possible to dispense with the conventional selective combining function at a mobile station.

In accordance with the present invention, it will suffice if the result of correction of user data by error correction code satisfies a required quality. As a result, it does not matter if the individual qualities of the user data and primary error correction code are less than the target quality.

In accordance with the present invention, the overall required band for communication can be reduced. As a result, the SF used between the base station and mobile station that transmit the error correction code can be enlarged. Consequently, radio resources (usable code) can be assured in comparison with the selective combining method.

In accordance with the present invention, the requested quality of user data is judged by data prevailing after the primary error correction. As a result, the quality of data prevailing after the secondary error correction can be made lower with respect thereto and it is possible to lower the transmission power value or raise the transmission rate.

What is claimed is:

1. A communication method for a mobile communication system, said communication method comprising:

transmitting data and an error correction code for said data from a transmitting side via separate transmission paths, wherein said data is transmitted via a transmission path without attaching any part of said error correction code, and receiving at a receiving side, said data and said error correction code for said data and conducts error correction decoding by an error correction unit using both of said received data and said received error correction code.

2. The communication method according to claim 1, wherein said error correction code is transmitted so that said error correction code is received at said receiving side before a reception timing of said data or within a predetermined time period from said reception timing.

3. A wireless communication system comprising:

transmitting mean for transmitting first data via a first path, second data via a second path and third data via third path wherein said third data includes a first error correction code for said first data and a second error correction code for said second data; and means for receiving said first data, said second data and said third data to be decoded via said first path, said second path and said third path.

* * * * *